US008034140B2

(12) United States Patent
Conrad

(10) Patent No.: US 8,034,140 B2
(45) Date of Patent: Oct. 11, 2011

(54) CONFIGURATION OF A CYCLONE ASSEMBLY AND SURFACE CLEANING APPARATUS HAVING SAME

(75) Inventor: Wayne Ernest Conrad, Hampton (CA)

(73) Assignee: G.B.D. Corp., Nassau (BS)

(*) Notice: Subject to any disclaimer, the term of this patent is extended or adjusted under 35 U.S.C. 154(b) by 274 days.

(21) Appl. No.: 12/338,021

(22) Filed: Dec. 18, 2008

(65) Prior Publication Data

US 2009/0205160 A1    Aug. 20, 2009

Related U.S. Application Data

(60) Provisional application No. 61/014,983, filed on Dec. 19, 2007.

(51) Int. Cl.
*B01D 45/12* (2006.01)
(52) U.S. Cl. ........ 55/345; 55/337; 55/424; 55/426; 55/428; 55/459.1; 55/447; 55/DIG. 3; 15/352; 15/353
(58) Field of Classification Search .......... 55/337, 55/424, 426, 428, 459.1, DIG. 3; 15/352, 15/353
See application file for complete search history.

(56) References Cited

U.S. PATENT DOCUMENTS

| 4,373,228 | A | | 2/1983 | Dyson | |
| 4,790,865 | A | * | 12/1988 | DeMarco | 55/337 |
| 5,139,652 | A | | 8/1992 | LeBlanc | |
| 5,922,093 | A | * | 7/1999 | James et al. | 55/322 |
| 6,171,356 | B1 | | 1/2001 | Twerdun | |
| 6,406,505 | B1 | * | 6/2002 | Oh et al. | 55/337 |
| 6,432,154 | B2 | | 8/2002 | Oh et al. | |
| 6,532,620 | B2 | | 3/2003 | Oh | |
| 6,810,558 | B2 | * | 11/2004 | Lee | 15/353 |
| 6,868,578 | B1 | * | 3/2005 | Kasper et al. | 15/347 |
| 7,086,119 | B2 | | 8/2006 | Go et al. | |
| 7,160,346 | B2 | | 1/2007 | Park | |
| 7,419,521 | B2 | * | 9/2008 | Oh et al. | 55/337 |
| 7,544,224 | B2 | * | 6/2009 | Tanner et al. | 55/337 |
| 7,736,408 | B2 | * | 6/2010 | Bock et al. | 55/337 |
| 2002/0020154 | A1 | * | 2/2002 | Yang | 55/337 |
| 2002/0134059 | A1 | * | 9/2002 | Oh | 55/337 |

FOREIGN PATENT DOCUMENTS

| EP | 0493950 B1 | 4/1998 |
| EP | 1779761 A2 | 5/2007 |
| WO | 96/40840 A1 | 12/1996 |
| WO | 2007021043 A1 | 2/2007 |

OTHER PUBLICATIONS

Handbook of Air Pollution Prevention and Control, Cheremisinoff, N.P., pp. 397-404, USA, 2002.
International Search Report received on the corresponding International Patent Applicaiton No. PCT/CA2008/002258, dated Apr. 9, 2009.

* cited by examiner

*Primary Examiner* — Jason M Greene
*Assistant Examiner* — Dung H Bui
(74) *Attorney, Agent, or Firm* — Bereskin & Parr LLP/S.E.N.C.R.L., s.r.l.; Phillip C. Mendes da Costa

(57) ABSTRACT

A cyclone separator useable in a surface cleaning apparatus comprises a cyclone casing defining a cyclone chamber and having first and second opposed ends and a sidewall extending between the first and second ends. A transition member is provided adjacent the end of the cyclone casing distal to the fluid inlet. The transition member has an inner surface the extends inwardly between the sidewall and the distal end.

43 Claims, 31 Drawing Sheets

CONFIGURATION OF A CYCLONE ASSEMBLY AND SURFACE CLEANING APPARATUS HAVING SAME

FIELD

This invention relates to a cyclone separator. In a preferred embodiment, the invention relates to a cyclonic separator, or a plurality of cyclonic separators in parallel, utilized as a cleaning stage in a surface cleaning apparatus such as a vacuum cleaner.

BACKGROUND

Cyclonic separators, including those used in vacuum cleaners are known in the art. Typically, a cyclonic separator has an inlet for fluid (air, liquid or and air and liquid mix) to be treated and an outlet for treated fluid. Dirt may be collected either in the cyclone chamber itself (e.g. in the bottom) or in a collection chamber in fluid communication with the cyclone separator. Various such constructions are known in the art.

U.S. Pat. No. 7,086,119 (Go et al) discloses a dust-collecting unit for a vacuum cleaner. The dust-collecting unit includes a cyclone separator having a dirt collection chamber positioned adjacent one lateral side of the cyclone separator. A dirt outlet is provided in the upper wall of the cyclone such that dirt may enter the adjacent dirt collection chamber through the outlet in the upper wall of the cyclone separator. A second dirt collection chamber is positioned below the cyclone chamber and is accessed by an opening formed in a separating plate that separates the cyclone chamber and the second dirt collection chamber. An openable bottom is provided. However, when the bottom is opened, the cyclone chamber is still closed by the separating plate.

U.S. Pat. No. 7,160,346 (Park) discloses a cyclone for use in a vacuum cleaner having a dirt collection space positioned below the cyclone chamber. A dirt outlet is provided as an annular gap between the sidewall of the cyclone chamber and a separating plate for permitting dirt to travel downwardly from the cyclone into the dirt collection chamber. Accordingly, the dirt collection chamber is not exterior to the cyclone casing but is within the casing.

SUMMARY

In accordance with this invention, a cyclone separator is provided with an inwardly directed transition member that extends between a sidewall of the cyclone casing and an end wall of the cyclone casing. The transition member may extend at an angle or may be curved inwardly. If the cyclone separator is oriented in an upright fashion, then the fluid inlet is provided adjacent the upper end of the cyclone and the fluid exit may also be provided adjacent the upper end of the cyclone. Accordingly, the transition member would extend downwardly and inwardly from the sidewall to the lower end wall that is positioned distal to the fluid inlet. It will be appreciated that if the cyclone separator were to be inverted, then the fluid inlet would be positioned on the bottom and the end wall would be positioned above the inlet (e.g., the end wall would be an upper end wall). In such an orientation, the transition member will extend upwardly and inwardly from the sidewall to the end wall. It will also be appreciated that the cyclone separator could also be oriented horizontally, or at any other angle.

A separated material outlet (e.g., a dirt outlet if the cyclone is used in a vacuum cleaner) is provided in the cyclone casing that surrounds the cyclone chamber of the cyclone separator. Preferably, the separated material outlet is provided adjacent the end wall distal to the fluid inlet and, more preferably, the dirt outlet is provided at least partially in the transition member. Most preferably, the dirt outlet is provided in the transition member. In one particular embodiment, only a single dirt outlet is provided.

A separated material collection chamber (e.g., a dirt collection chamber) is provided downstream from the separated material outlet (e.g., the dirt outlet) and preferably surrounds at least a portion of and, more preferably, extends completely around, the cyclone casing. Accordingly, fluid will enter a cyclone chamber through the fluid inlet at one end and travel towards the distal end wall of the cyclone chamber. As the fluid travels through the cyclone chamber, it will rotate and heavier material (e.g. particulate matter) will exit the cyclone chamber via the separated material outlet. The fluid will then reverse direction and exit the cyclone chamber through the fluid outlet.

Surprisingly, it has been determined that despite the transition member extending inwardly (e.g. angled, curved or otherwise), that the separation efficiency of the cyclone separator is very high. In particular, as the transition member extends inwardly, it might be considered that the inward directed portion of the cyclone wall defined by the transition member would reduce the separation efficiency by causing heavier material to be directed inwards towards the centre of the cyclone chamber where it would be re-entrained with the fluid exiting the cyclone. However, it has unexpectedly been determined that providing the transition member and a separated material outlet positioned proximate thereto and, preferably within the transition member, results in increased separation efficiency.

It will be appreciated by those skilled in the art that the cyclone separator disclosed herein may be utilized with any fluid stream (e.g. liquid and/or gas). In addition, it will be appreciated by those skilled in the art that the cyclone separator may be used in any consumer appliance and, preferably, is utilized in a surface cleaning apparatus or an air cleaner. The surface cleaning apparatus may be a vacuum cleaner, including an upright vacuum cleaner, a stick vacuum cleaner, a canister vacuum cleaner, a back pack vacuum cleaner, a strap carriable vacuum cleaner or a portable vacuum cleaner; a carpet extractor, a bare floor cleaner or the like.

DETAILED DESCRIPTION

Figure 1:
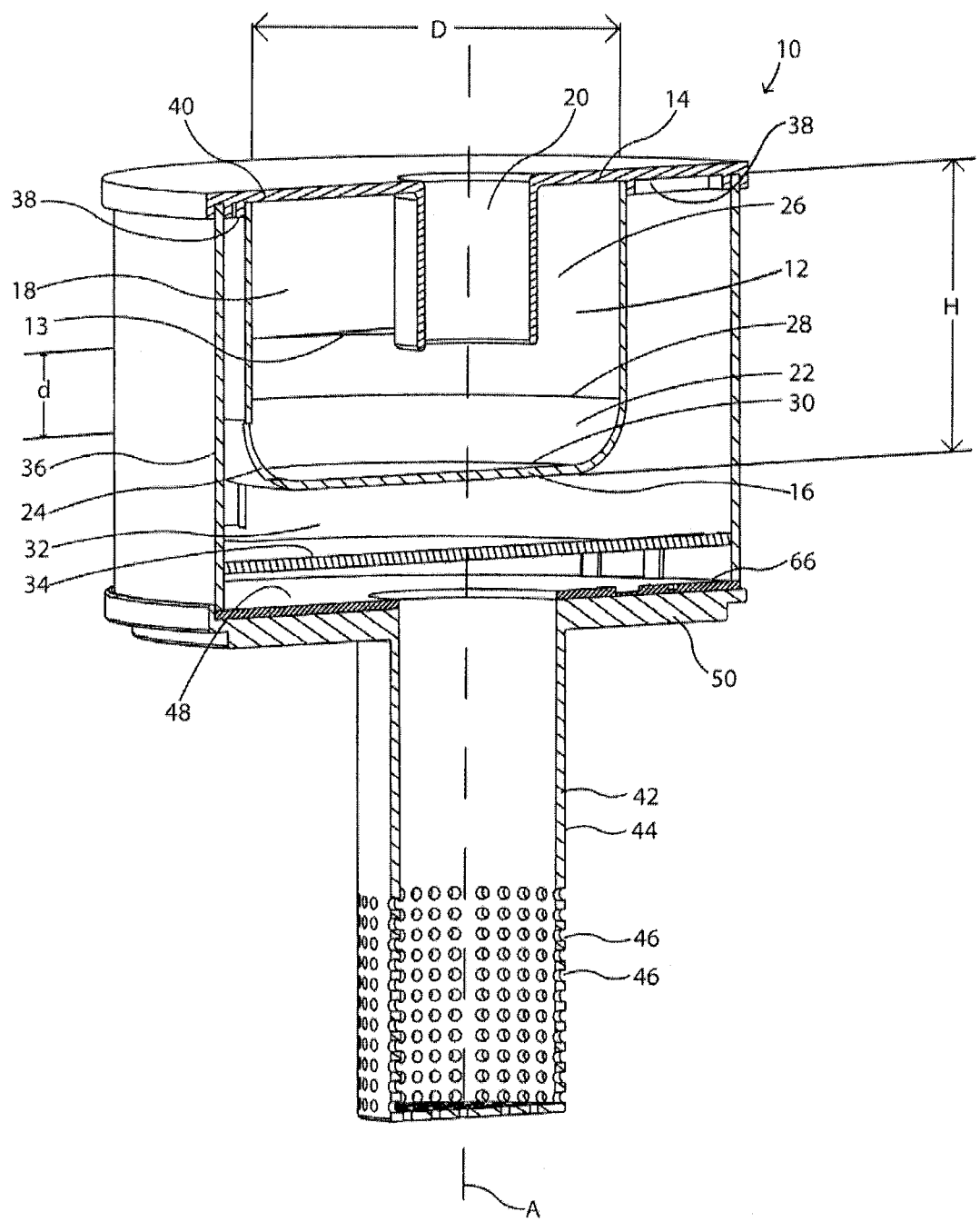
FIG. 1 is a perspective vertical section through a cyclone separator according to a first embodiment of this invention wherein the cyclone separator is oriented in an upright fashion.
Figure 1A:
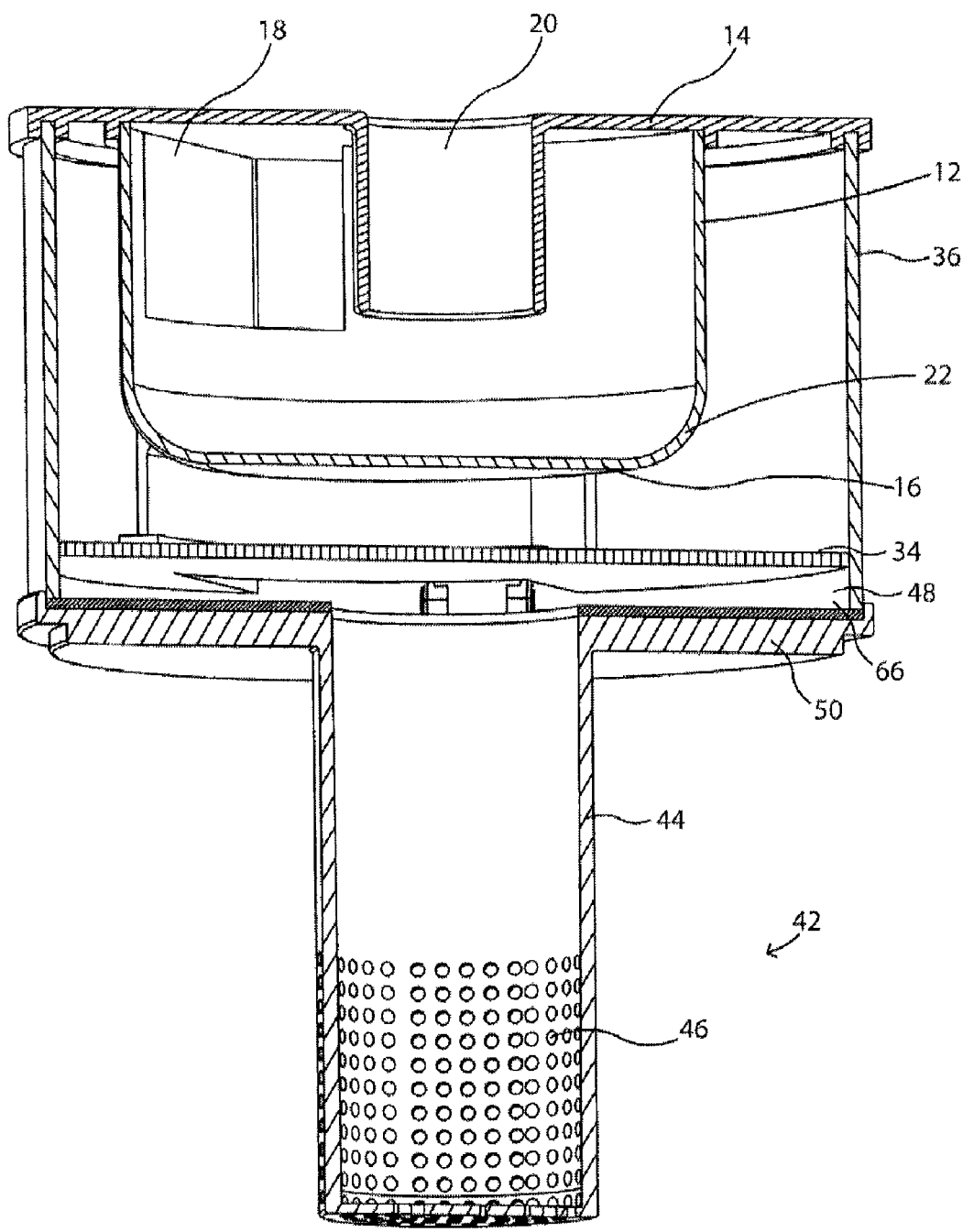
FIG. 1a is a vertical section through the cyclone separator of FIG. 1.
Figure 1B:
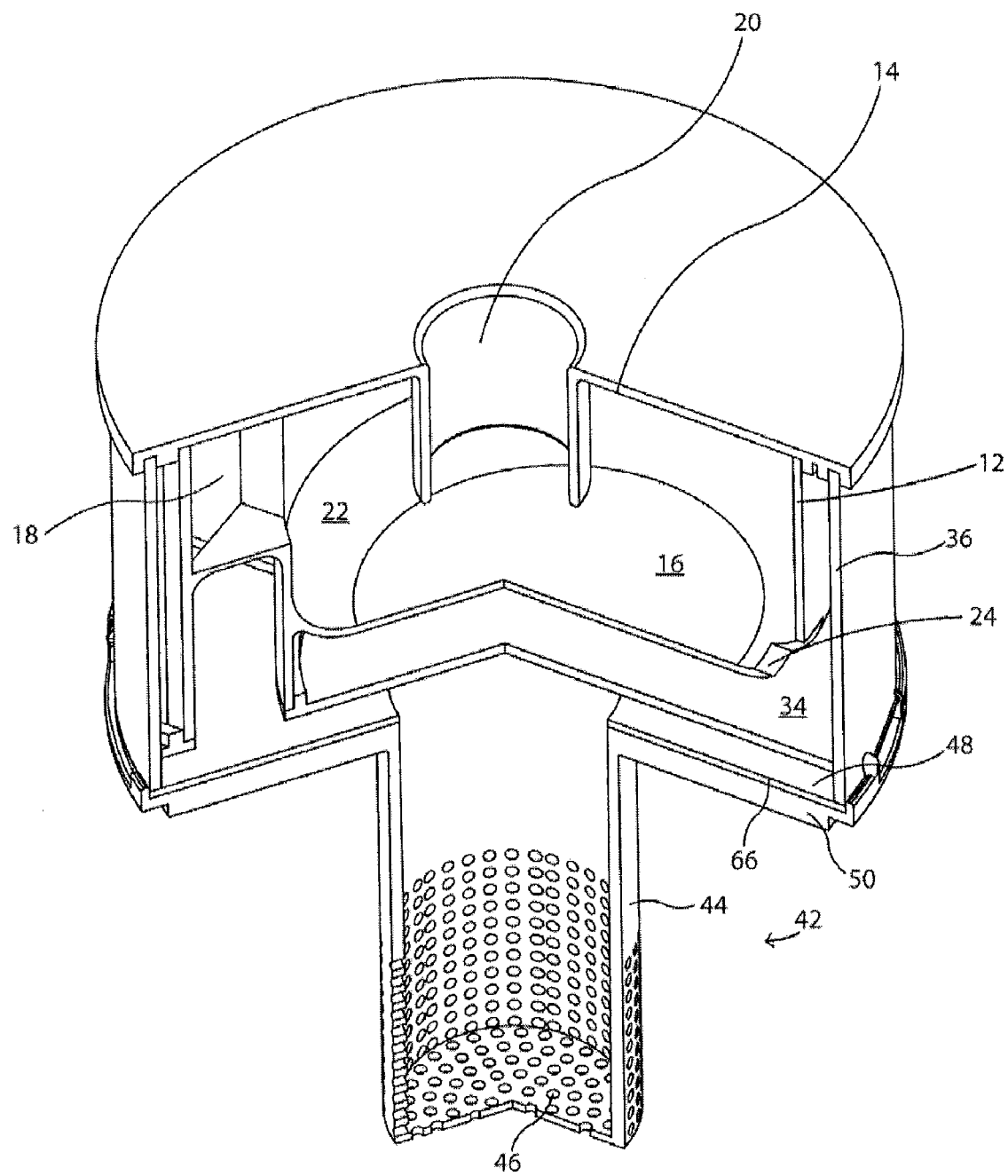
FIG. 1b is a perspective vertical section looking downwardly through the cyclone separator of FIG. 1.

In the following description of the preferred embodiment, the cyclone separator is described as used in a vacuum cleaner of any particular design. As exemplified in FIG. 28, surface cleaning apparatus 120 may be an upright vacuum cleaner having a surface cleaning head 122 and a vacuum cleaner body 124 pivotally mounted thereto. Handle 126 may be provided for moving surface cleaning apparatus 120. Surface cleaning apparatus 120 has a first cyclonic cleaning stage 128 and a second cyclonic cleaning stage 130. However, it will be appreciated that the description set out herein is not confined to such uses as may be used for any other application referred to herein or known in the art.

As exemplified in FIGS. 1-5, a cyclone separator assembly 10 comprises a cyclone casing defining a cyclone chamber 26 and comprising a sidewall 12, air or fluid inlet 18, air or fluid outlet 20, a transition member 22 and a dirt or separated material outlet 24. The cyclone casing has first and second spaced apart portions. The first portion comprises first end wall 14 and the second portion comprises an opposed second end wall 16.

First and second end walls 14 and 16 are spaced apart and are positioned opposite each other. Preferably, as exemplified, air inlet 18 is provided in sidewall 12 and, more preferably, adjacent first or upper end 14. In addition, air outlet 20 is preferably provided in upper first end 14 and, preferably, is centrally located therein. As exemplified in FIG. 13a, the lower end of outlet 20 is preferably position above the top of dirt outlet 24. Accordingly, as exemplified in a vertical orientation in FIG. 2, air entering the cyclone casing will travel in a cyclonic fashion downwardly towards second lower end wall 16. Heavier material, e.g. particulate material, will exit cyclone chamber 26 via dirt outlet 24. The air at some point reverses direction and travels upwardly through outlet 20 to exit cyclone chamber 26.

As shown in FIG. 1, sidewalls 12 preferably extend linearly (i.e. it is straight) and, in the orientation shown in FIG. 1, vertically. Preferably, sidewall 12 meets upper end wall 14 at about 90° such that upper first end wall 14 is essentially perpendicular to sidewall 12. In addition, lower second end wall 16 is preferably parallel to first end wall 14. Accordingly, but for transition member 22, the cyclone casing is exemplified as being cylindrical. It will be appreciated that while cyclone separator 10 is preferably generally cylindrical, it may have other shapes. For example, it may be frustoconical as is also known in the art. In addition, air inlet 18 and air outlet 20 may be of any construction and positioning known in the art.

Transition member 22 is provided adjacent lower end wall 16 and preferable is immediately adjacent lower end wall 16. Accordingly, transition member 22 may link sidewall 12 and lower end wall 16. For example, as exemplified in FIG. 1, transition member 22 extends between lower end 28 of sidewall 12 and outer end 30 of lower end wall 16. If the cyclone separator is oriented as shown in FIG. 1 (it is in an upright orientation), then transition member 22 extends downwardly and inwardly.

It will be appreciated that transition member 22 may have a variety of configurations. For example, transition member 22 may be a single surface that extends at an angle from lower end 28 of sidewall 12 to outer end 30 of lower end wall 16 (see for example FIGS. 21 and 22). As exemplified, sidewall 12 extends between the first end 14 and transition member 22 in a first direction (vertically), second end 16 extends in a second direction (horizontally), and transition member 22 extends in at least one third direction from sidewall 12 to the second end 16. Accordingly, it will be appreciated that the transition member extends in a third direction (other than the direction of sidewall 12 and the direction of end wall 16). Accordingly, transition member 22 may be at an angle to the longitudinal axis of sidewall 12, at an angle to the longitudinal axis A of the cyclone separator itself and at an angle to the plane of lower end 16 (the horizontal plane as exemplified in FIGS. 21 and 22).

Alternately, a plurality of angled surfaces may be provided. Alternately, and preferably, transition member 22 may be curved and, more preferably, is radiused. In a particularly preferred embodiment, transition member 22 describes part of an arc of a circle which may have a radius from 0.125 inches to 2 inches, more preferably from 0.25 to 1 inch, even more preferably from about 0.375 to 0.75 inches and most preferably about 0.5 inches.

Figure 23:
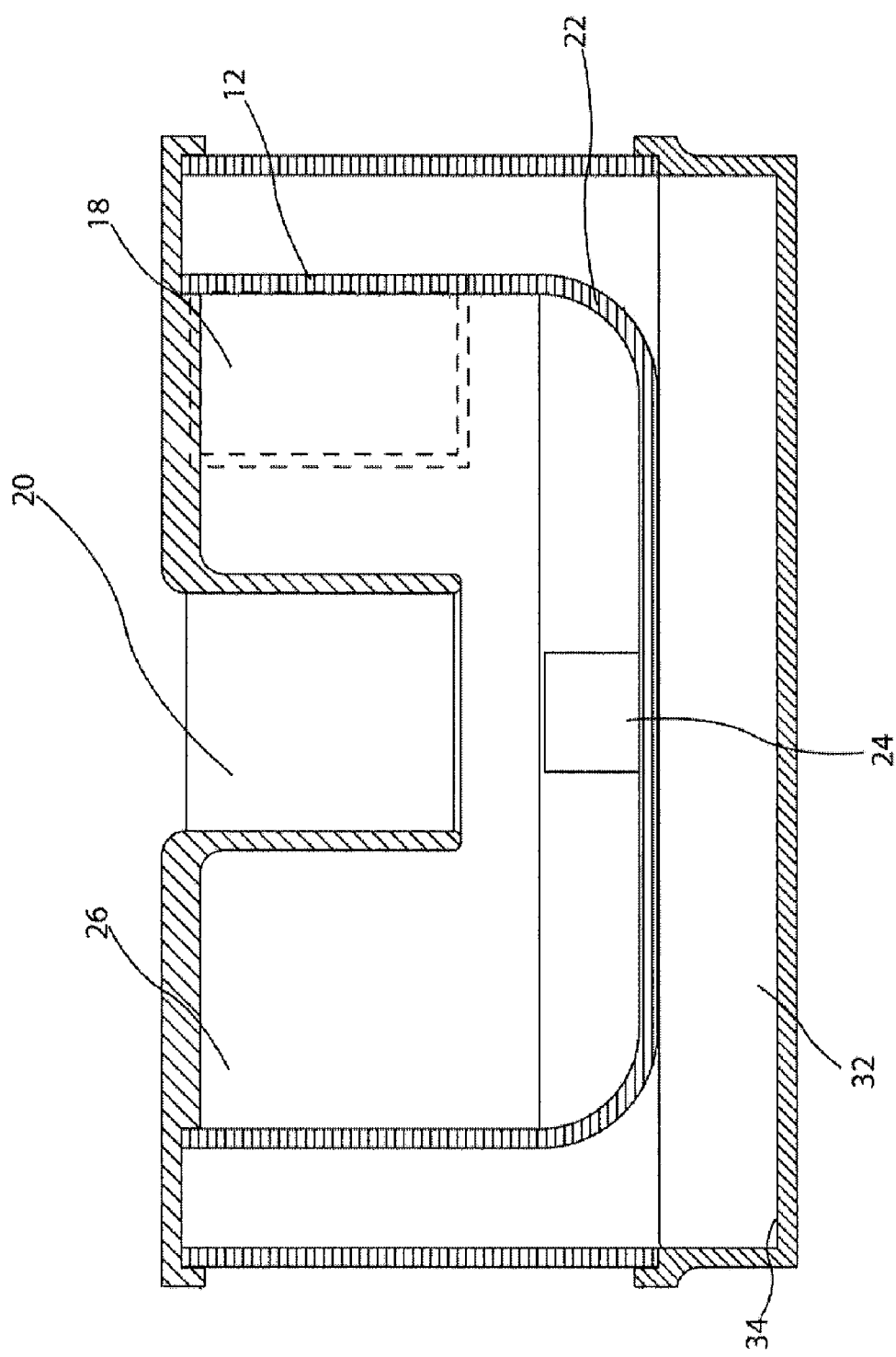
FIG. 23 is a front view of a vertical section of a cyclonic cleaning stage according to a seventh embodiment of this invention wherein the transition member is rounded, the cyclonic cleaning stage comprises a single cyclone and the separated material outlet extends above the transition member and is positioned about 270° around the cyclone casing in a flow direction from the fluid inlet.

Preferably, dirt outlet 24 is provided in a lower portion of the cyclone separator. Preferably, at least a portion of dirt outlet 24 is provided in transition member 22. For example, as exemplified in FIGS. 23 and 24, dirt outlet 24 may extend above transition member 22. Preferably, as exemplified in FIG. 1, dirt outlet 24 is positioned completely within transition member 22. For example, as exemplified in FIG. 20, dirt outlet 24 extends to the juncture of transition member 22 and sidewall 12. Alternately, as exemplified in FIG. 21, dirt outlet 24 may terminate at a position below the juncture of transition member 22 and sidewall 12.

Figure 12:
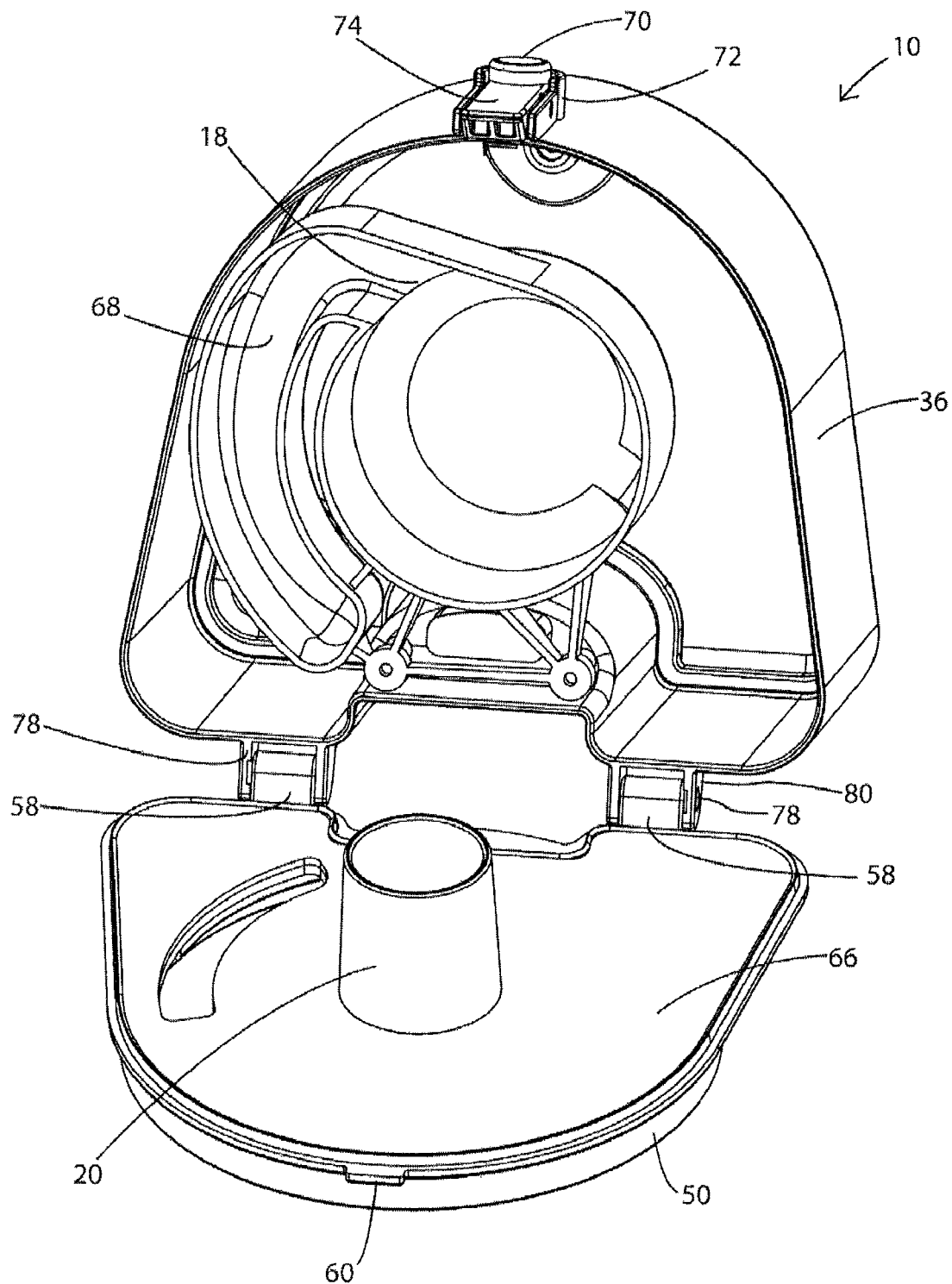
FIG. 12 is an end view of the opened cyclone separator shown in FIG. 11.
Figure 24:
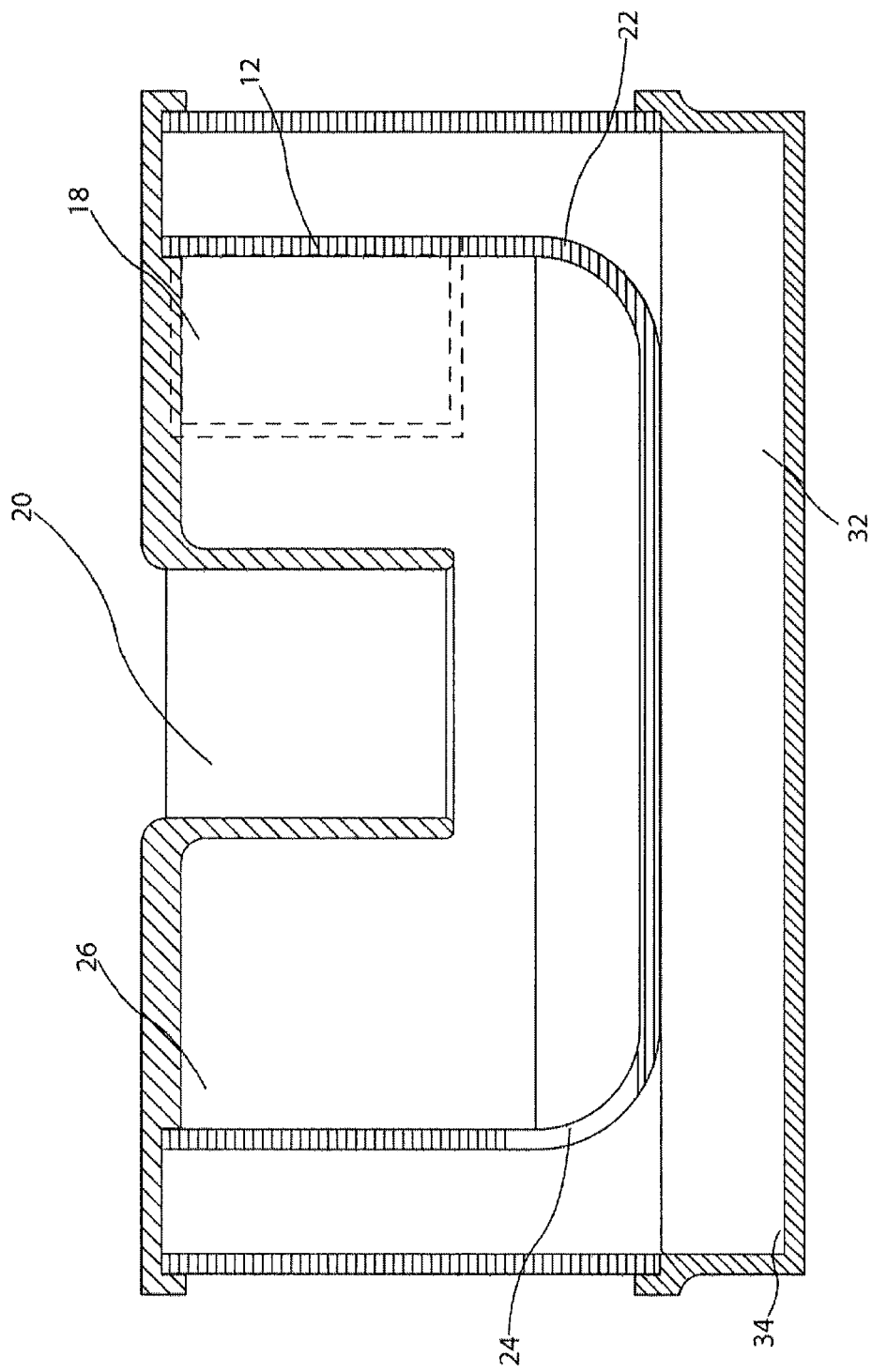
FIG. 24 is a front view of a vertical section of a cyclonic cleaning stage according to an eighth embodiment of this invention wherein the transition member is rounded, the cyclonic cleaning stage comprises a single cyclone and the separated material outlet extends above the transition member and is positioned opposed to the air inlet.

One or more dirt outlets 24 may be provided for a single cyclone chamber 26. Preferably, a single dirt outlet 24 is provided, as exemplified in FIG. 1. The one or more dirt outlets 24 may be positioned at any angular displacement B with respect to inlet 18 (see for example FIG. 27). Dirt outlet may be displaced from about 90 to about 330 degrees, preferably from about 180 to about 300 degrees, more preferably from about 240 to about 300 degrees and most preferably about 270 degrees in the flow direction from air inlet 18. For example, as shown in FIGS. 12 and 24, dirt outlet 24 may be displaced about 180 degrees in the flow direction around cyclone chamber 26 from inlet 18 (i.e., dirt outlet 24 is generally opposed to air inlet 18). Alternately, as exemplified in FIG. 23, dirt outlet may be displaced about 90 degrees in the flow direction around cyclone chamber 26 from inlet 18. It is preferred that outlet 24 having such an angular positioning is provided in a lower portion of the cyclone casing as discussed herein.

As shown in FIG. 1, the cyclone chamber has a height H (i.e., the distance between first and second opposed end walls 14 and 16) and a diameter D (i.e. the diameter of sidewall 12). Accordingly, height H is the combined height of sidewall 12 and transition member 22. In a broad aspect of this invention, height H and diameter D may be any of those known in the art. Preferably, height H is less than diameter D and, more preferably, height H is less than half of the diameter D.

It will be appreciated that transition member 22 may have any desired length. Accordingly, transition member 22 may extend from end wall 16 to inlet 18. However, it is preferred that a portion of sidewall 12 is provided between inlet 18 and transition member 22. For example, as shown in FIG. 1, sidewall 12 has a portion having a distance d that extends from bottom 13 of inlet 18 to lower end 28 of sidewall 12. Preferably, this section of sidewall is straight and, more preferably parallel to axis A (e.g., vertical as exemplified in FIG. 1 wherein the cyclone separator is oriented with the longitudinal axis A of the cyclone extending vertically). In particular, it is preferred that the section of sidewall having a length d is parallel to the longitudinal axis A of cyclone chamber 26. Lower end 13 of inlet 12 is preferably closer to second lower end 16 than first upper end 14. Accordingly, distance d may be less than the vertical height of the inlet 12.

Figure 2:
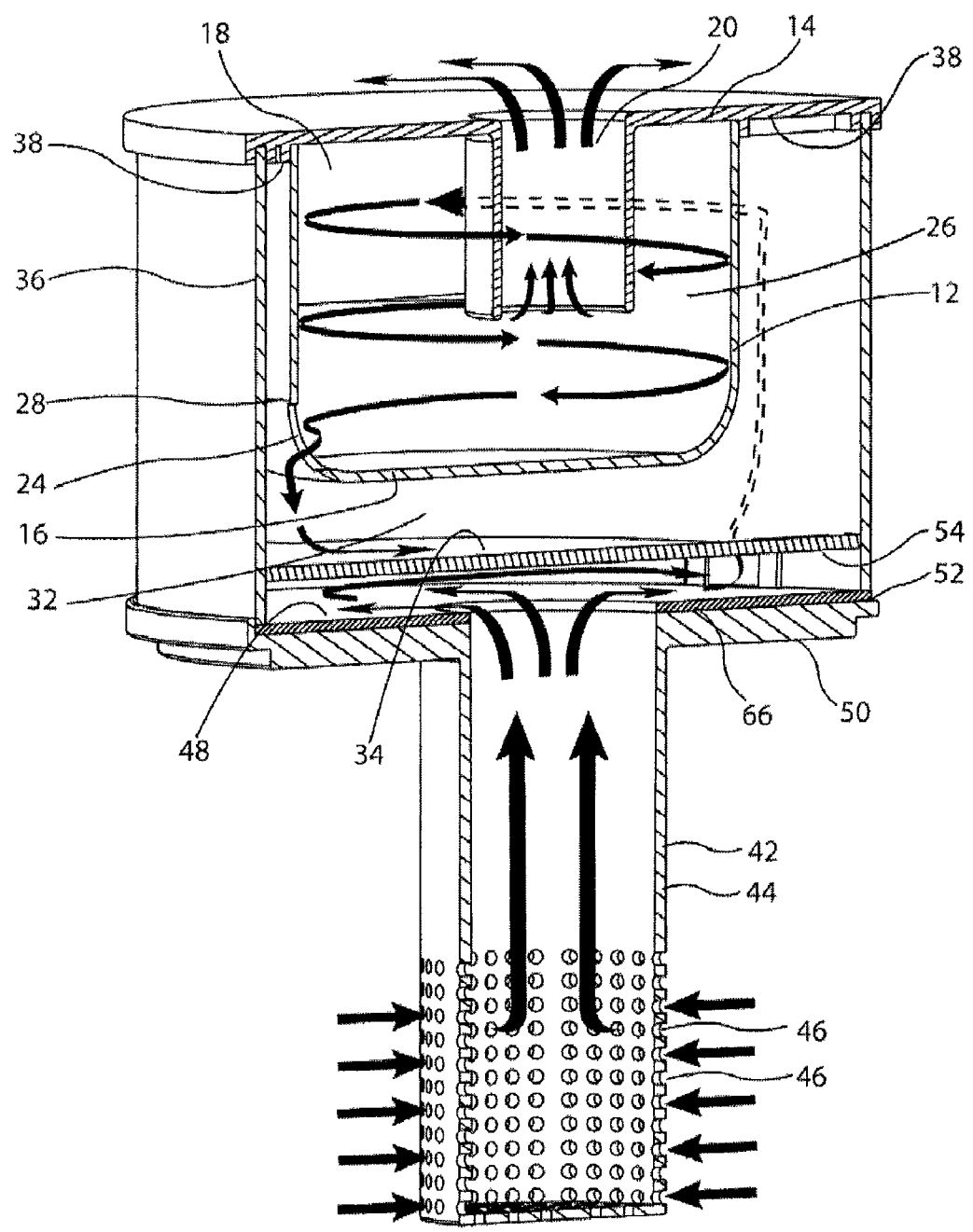
FIG. 2 is a vertical perspective view as shown in FIG. 1 including the air flow and dirt flow path through the cyclone separator.
Figure 3:
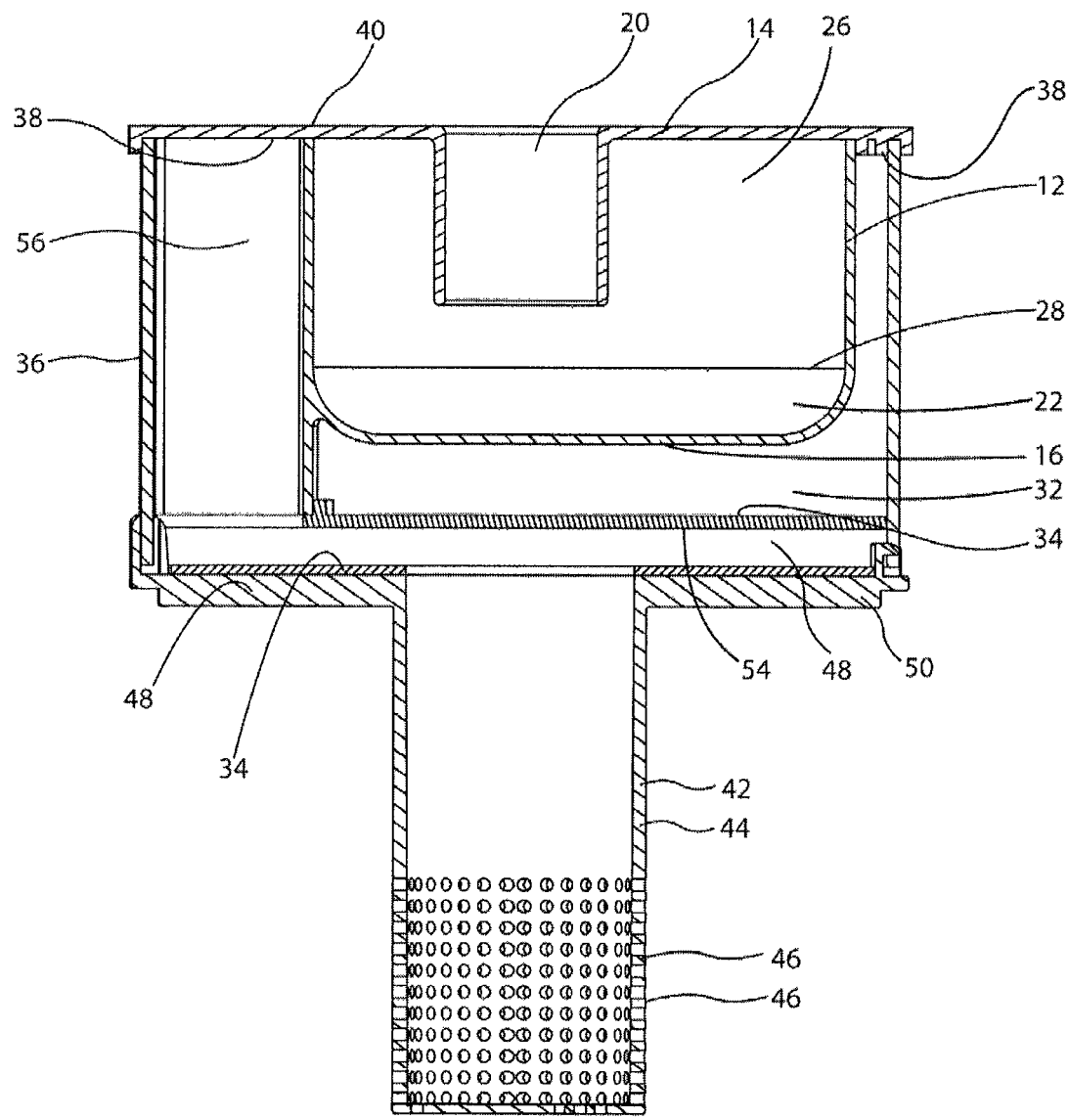
FIG. 3 is a side view of the vertical section of FIG. 1.

Dirt collection chamber or separated material collection chamber 32 is positioned in fluid flow communication with dirt outlet 24 and exterior to cyclone chamber 26. Dirt outlet 24 is a lateral outlet, i.e., the outlet is provided in sidewall 12 or transition member 22 so that the separated material travels at least partially laterally as it exits cyclone chamber 26. Dirt collection chamber 32 may be of any shape. As shown in FIG. 2, dirt or other heavy material will exit cyclone chamber 26 laterally via outlet 24 and then travel downwardly to accumulate on collection surface 34. As exemplified, dirt collection chamber 32 has a collection surface 34, sidewall 36 and a top wall 38.

Preferably, dirt collection chamber 32 surrounds at least a portion of the cyclone casing. Preferably, dirt collection chamber 32 surrounds the portions of the sidewall of the cyclone casing that are not provided with inlet 18. Alternately, as exemplified in FIG. 21, it may surround all of sidewall 12. The sidewalls of the cyclone casing and the collection chamber are spaced apart so as to define a gap, that may be an annular gap G if it fully surrounds the cyclone casing, that has a width D. Accordingly, the cyclone casing may be positioned fully within dirt collection chamber 32 as exemplified in FIG. 1.

In addition, the surface of collection chamber 32 opposed to and facing second end 16 (collection surface 34 in the cyclone is oriented upright and opposed surface 33 if the cyclone is inverted) is preferably spaced from end 16 of the cyclone casing. Preferably, collection surface 34 is an opposed surface facing the second end 16 and spaced from the second lower end 16 by at least about 0.5 inches.

Preferably, sidewall 12 may have an inlet section and a second section, and fluid inlet 18 is provided on the inlet section and the portion of sidewall 36 of separated material collection chamber 32 facing the second section of sidewall 12 of the cyclone casing is spaced apart by at least about 0.5 inches. As exemplified a gap having a width $D_{g1}$ may be provided around the second section of sidewall 12. Distance $D_{g1}$ is at least 0.5 inches. It will be appreciated that the annular gap $D_{g1}$ may be larger and need not have a uniform width. Further, a gap having a width $D_{g2}$ may be provided around the inlet section of sidewall 12. It will be appreciated that width $D_{g2}$ may be less than 0.5 and may be zero such that wall 69 of passage 68 merges with sidewall 36 of collection chamber 32 (see for example the embodiment of FIG. 27).

Accordingly, the cyclone casing is preferably positioned within dirt collection chamber 32 as exemplified in FIG. 1. It is also preferred that the surface opposed to and facing second end 16 (collection surface 34 in the cyclone is oriented upright and opposed surface 33 if the cyclone is inverted) is spaced from end 16 of the cyclone casing. Preferably, collection surface 34 is an opposed surface facing the second end 16 and spaced from the second lower end 16 by at least about 0.5 inches.

Figure 27:
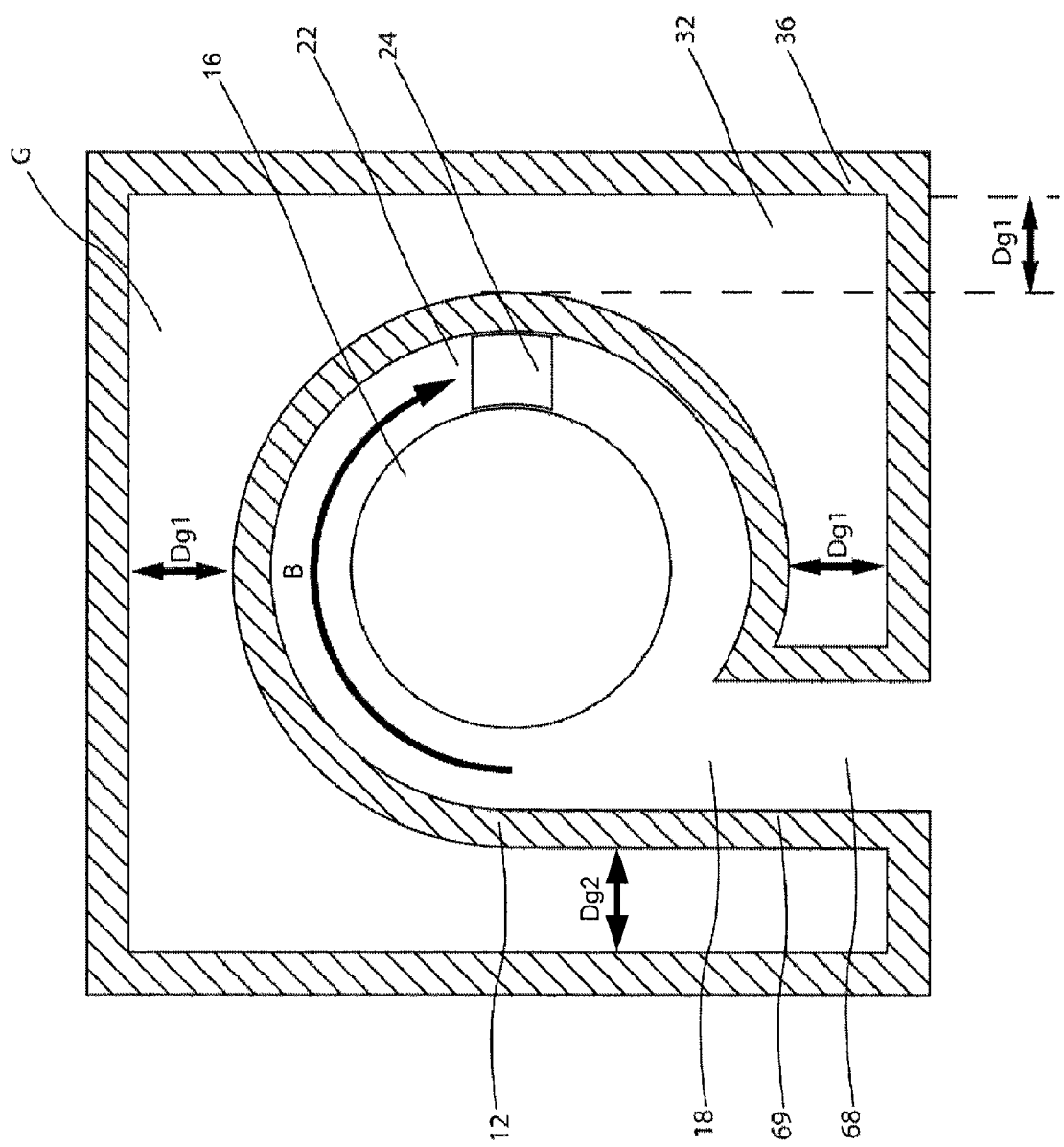
FIG. 27 is a top plan view of a cyclone chamber and a dirt collection chamber according to a tenth embodiment of this invention; and, FIG. 28 is a perspective view of a surface cleaning apparatus utilizing a cyclone separator assembly as setout herein

It will be appreciated that if the cyclone casing is positioned completely within dirt collection chamber 32 (i.e. dirt collection chamber 32 extends completely around the cyclone separator as exemplified in FIG. 27) then, top wall 38 of dirt collection chamber 32 may be annular in shape (i.e., extend between sidewall 12 of the cyclone and sidewall 36 of the dirt collection chamber 32).

Figure 4:
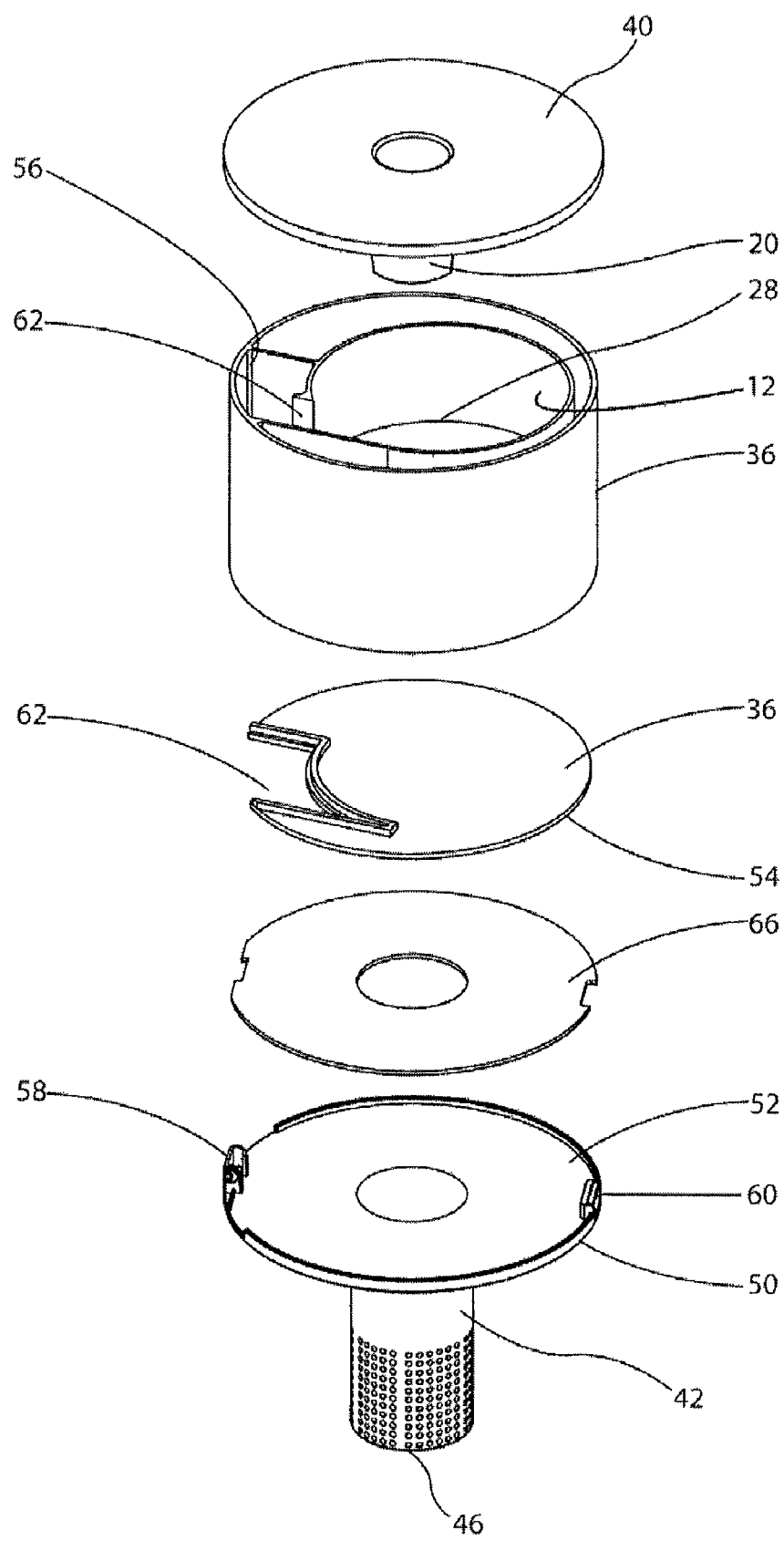
FIG. 4 is an exploded view of the cyclone separator of FIG. 1.
Figure 5:
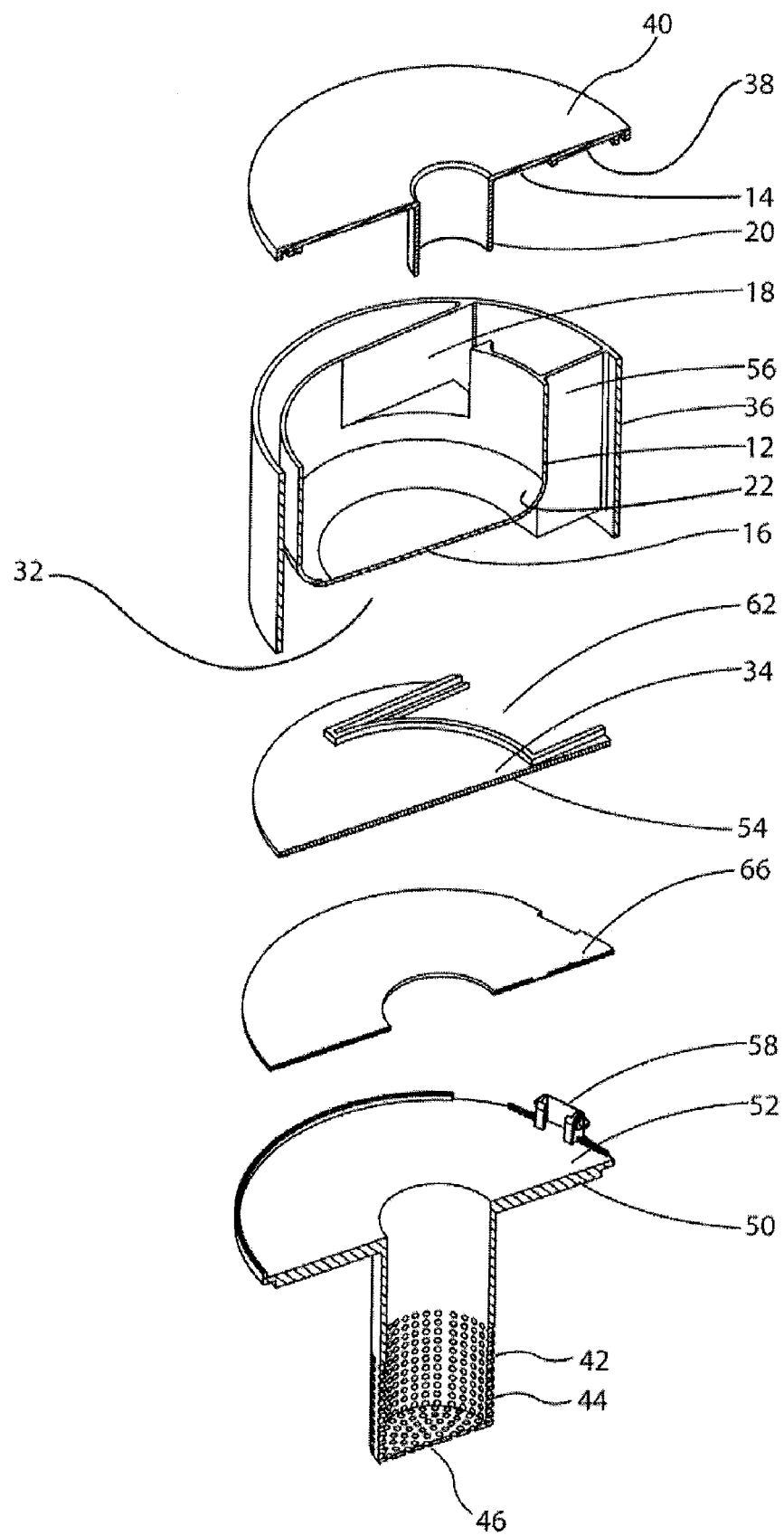
FIG. 5 is a vertical section through the exploded view of FIG. 4.

As exemplified in FIG. 4, top wall 38 of dirt collection chamber 32 and upper first end wall 14 of cyclone chamber 36 may be connected together and are preferably integrally molded as a continuous plate 40. Preferably, air outlet 24 may be provided as part of plate 40 and may be integrally molded therewith.

Figure 28:
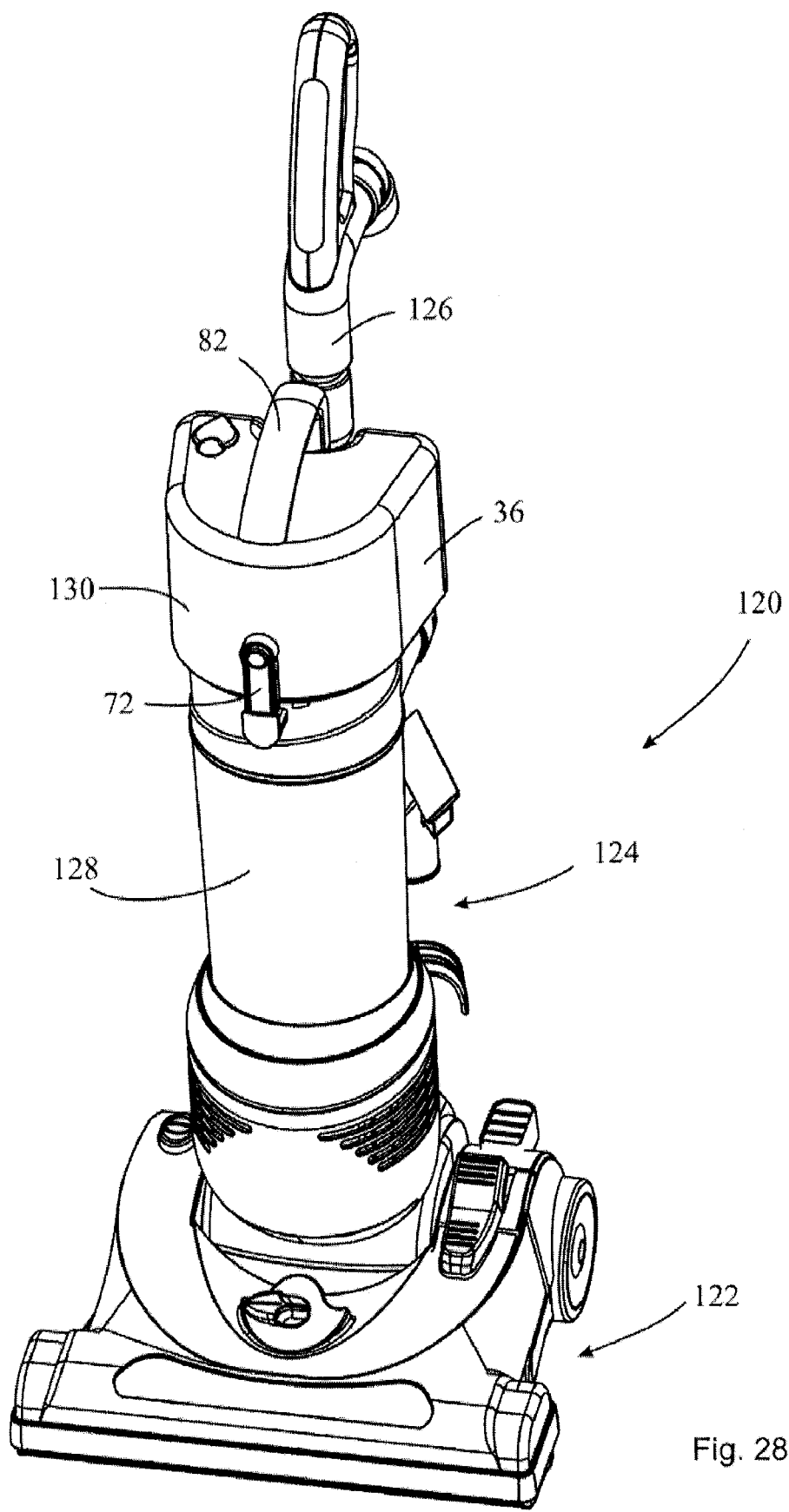

As exemplified in FIGS. 1 and 28, cyclone separator assembly 10 may be provided as a second cyclonic stage 130. Accordingly, cyclone separator assembly 10 preferably has provided as part thereof the air outlet or vortex finder 42 of an upstream cyclonic stage 128 (which is preferably a single cyclone but, as will be appreciated, could be a plurality of cyclones in parallel wherein the vortex finder of each is secured to, and removable with, cyclone separator assembly 10). Preferably, outlet 42 comprises a tubular member having sidewalls 44 wherein apertures 46 may be provided in a lower end thereof. Alternately, it will be appreciated that any air outlet or vortex finder of a cyclone known in the art may be utilized, and need not be provided as part of cyclone separator assembly 10. Vortex finder 42 is preferably attached to the bottom of cyclone separator assembly 10, e.g., bottom panel 50, and may be molded as part of bottom panel 50.

If the cyclone is downstream from another filtration member or air treatment member, then air inlet 18 may be in airflow communication therewith by any means known in the art. In a particularly preferred embodiment as illustrated in FIGS. 1-5, cyclone separator assembly 10 may incorporate an airflow passage from an upstream filtration stage to inlet 18. As illustrated therein, outlet 42 is in airflow communication with header 48. Header 48 is positioned between bottom panel 50 having an upper surface 52 and a lower surface 54 of collection surface 34.

If bottom panel 50 is openably, then in order to provide an airtight seal for bottom panel 50, a sealing gasket 66, O-ring or other sealing member known in the art may be provided. Gasket 66 may be mounted to, or removably mounted to, pivoting bottom 50. In such a case, header 48 may be positioned between gasket 66 and lower surface 54 of collection surface 34. From header 48, the air travels upwardly trough side air passage 56 (see FIGS. 3, 4 and 5). It will be appreciated that air passage 56 may be of any configuration known in the art. The airflow path is exemplified in FIG. 2.

Figure 7:
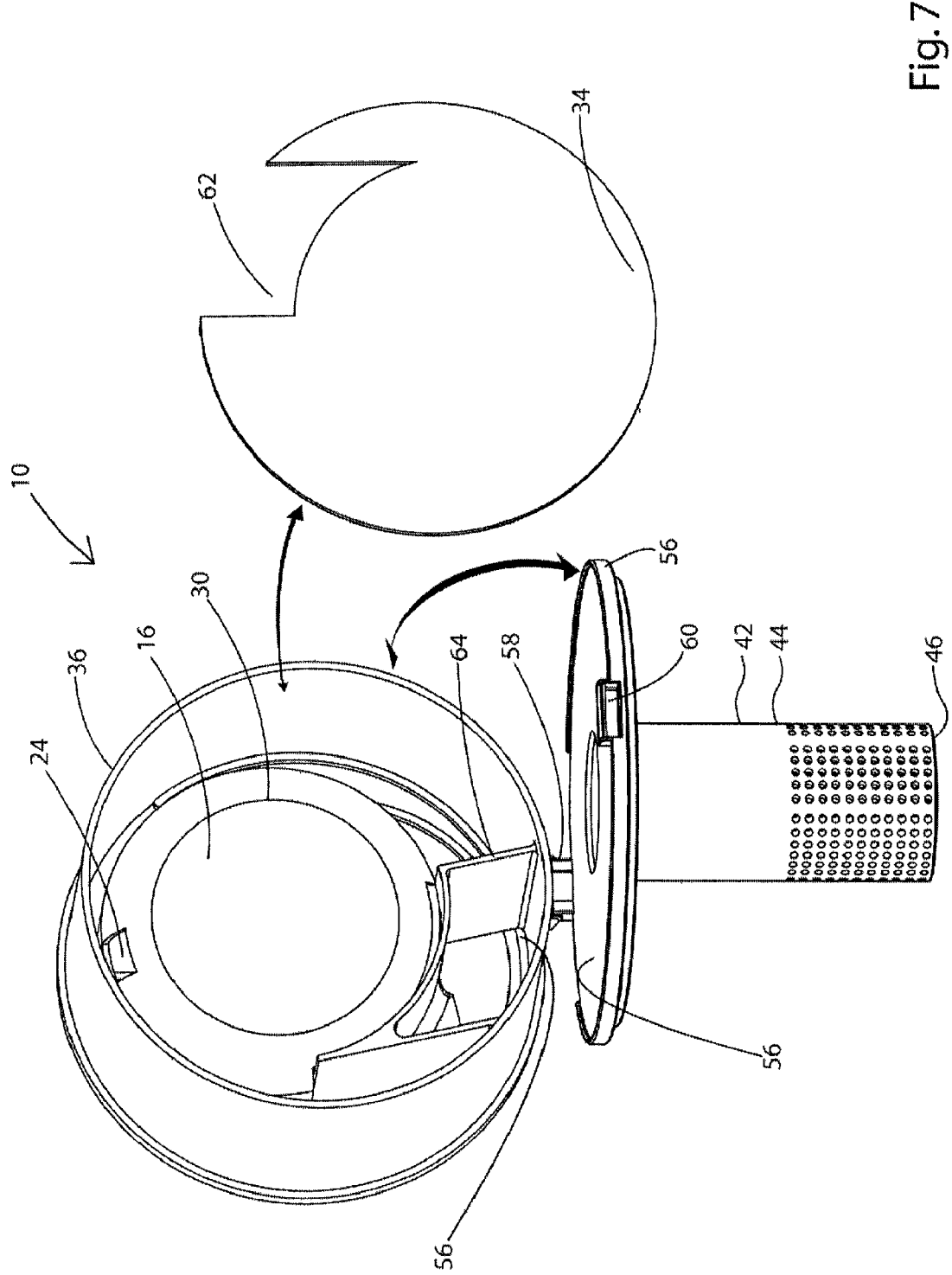
FIG. 7 is an end view of the opened cyclone separator shown in FIG. 6.
Figure 8:
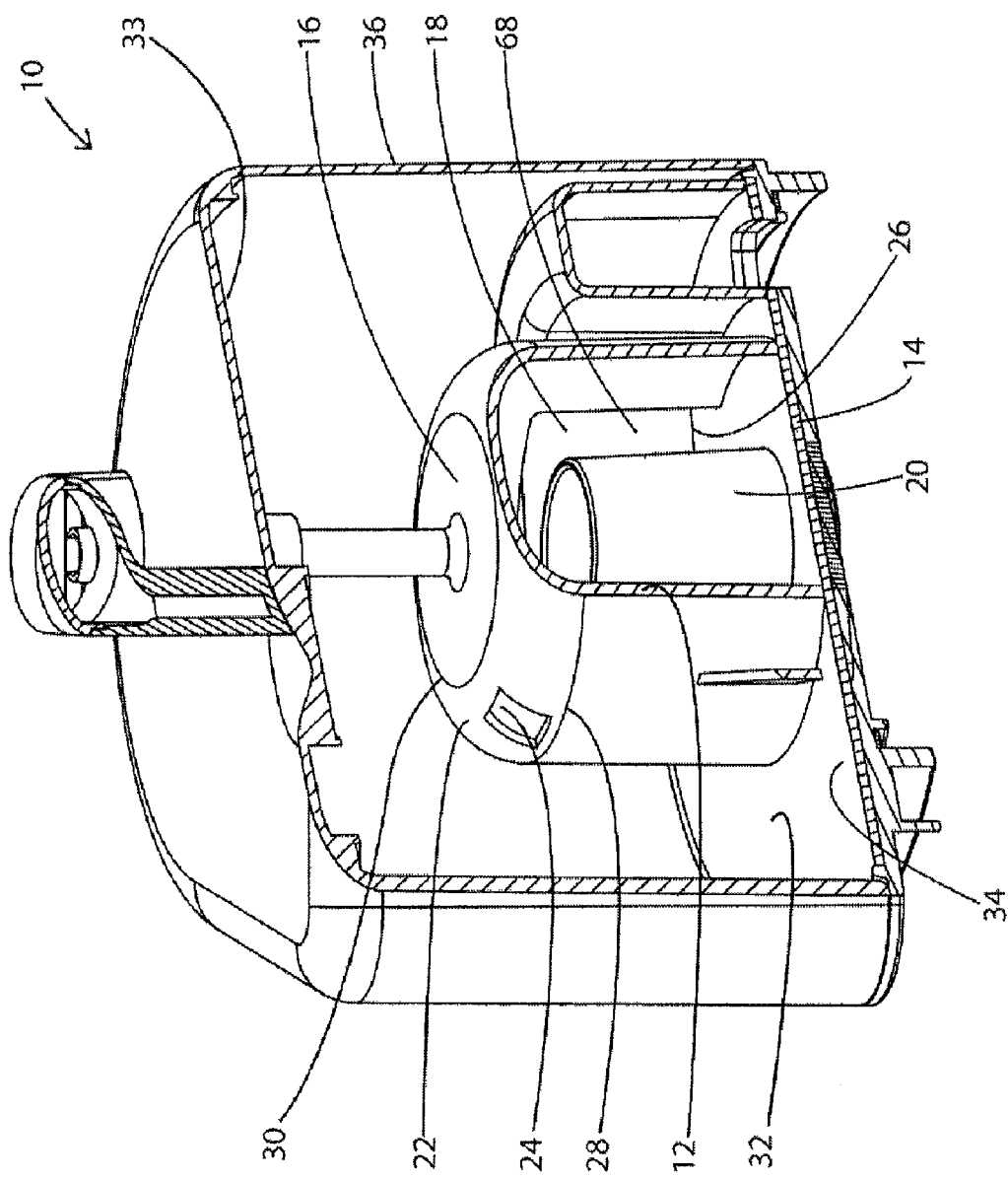
FIG. 8 is a vertical section through a cyclone separator according to a second embodiment of this invention wherein the cyclone separator is inverted.

In order to permit dirt collection chamber 32 to be emptied, bottom panel 50 may be pivotally attached to cyclone separator assembly 10. For example, flange 58 may be provided on bottom panel 50. A mating flange may be affixed to sidewall 36 (see FIG. 7). The flanges may be pivotally connected by any means known in the art. A latch may be provided on sidewall 36, which engages flange 60, which is provided on bottom panel 50. Accordingly, when in the closed position (shown in FIG. 1), the latch may engage flange 60, thereby securing bottom panel 50 in position. When released, bottom panel 50 may pivot to an open position (as shown in FIG. 7) permitting dirt collected in collection chamber 32 to be emptied. In such a case, a sealing gasket 66 or the like is preferably provided, e.g., mounted to upper surface 52 of panel 50, so as to open with panel 50. Any sealing member known in the art may be used.

Figure 6:
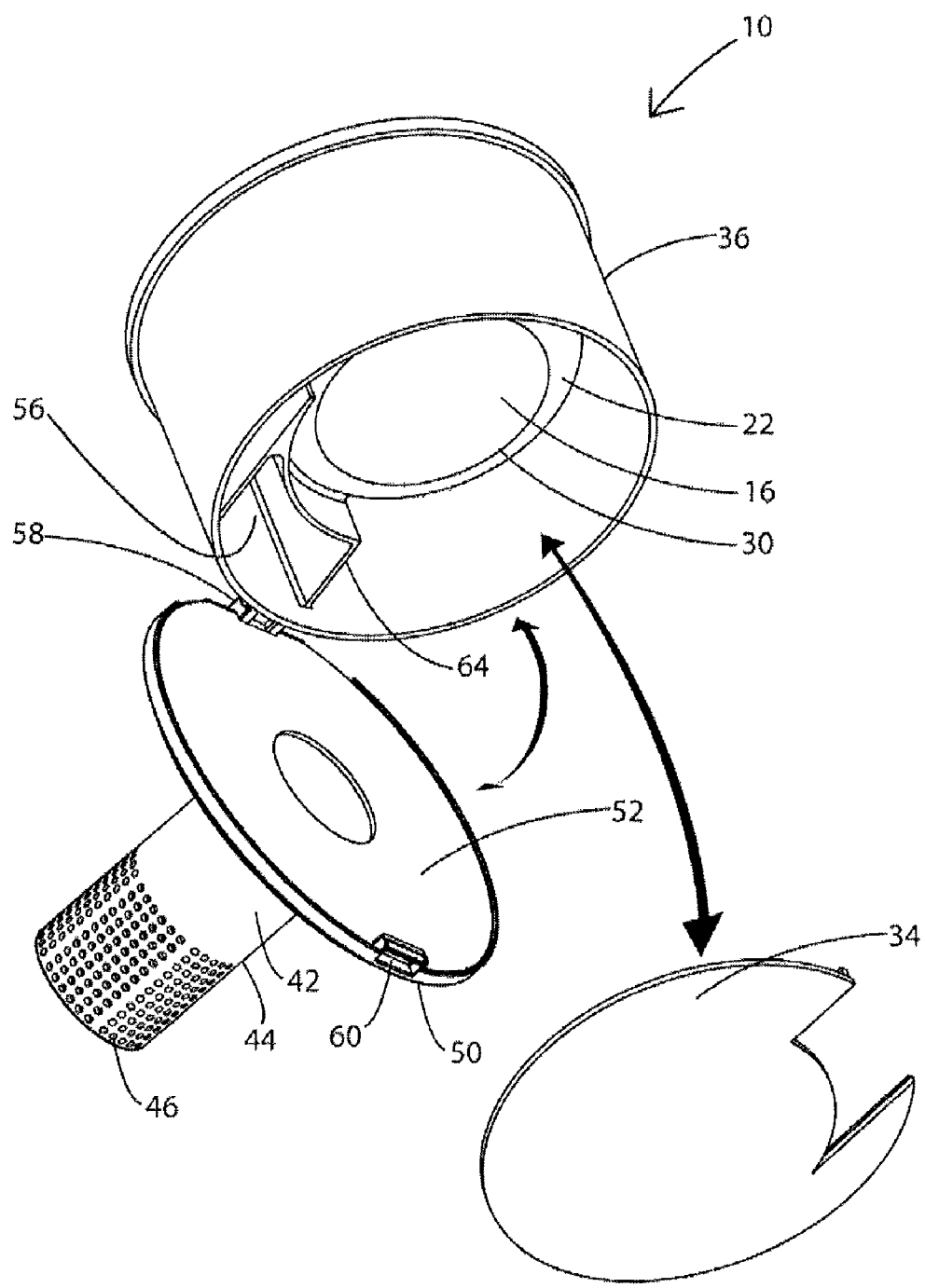
FIG. 6 is a perspective view showing an optional embodiment that permits the cyclone separator to be opened to permit emptying.
Figure 9:
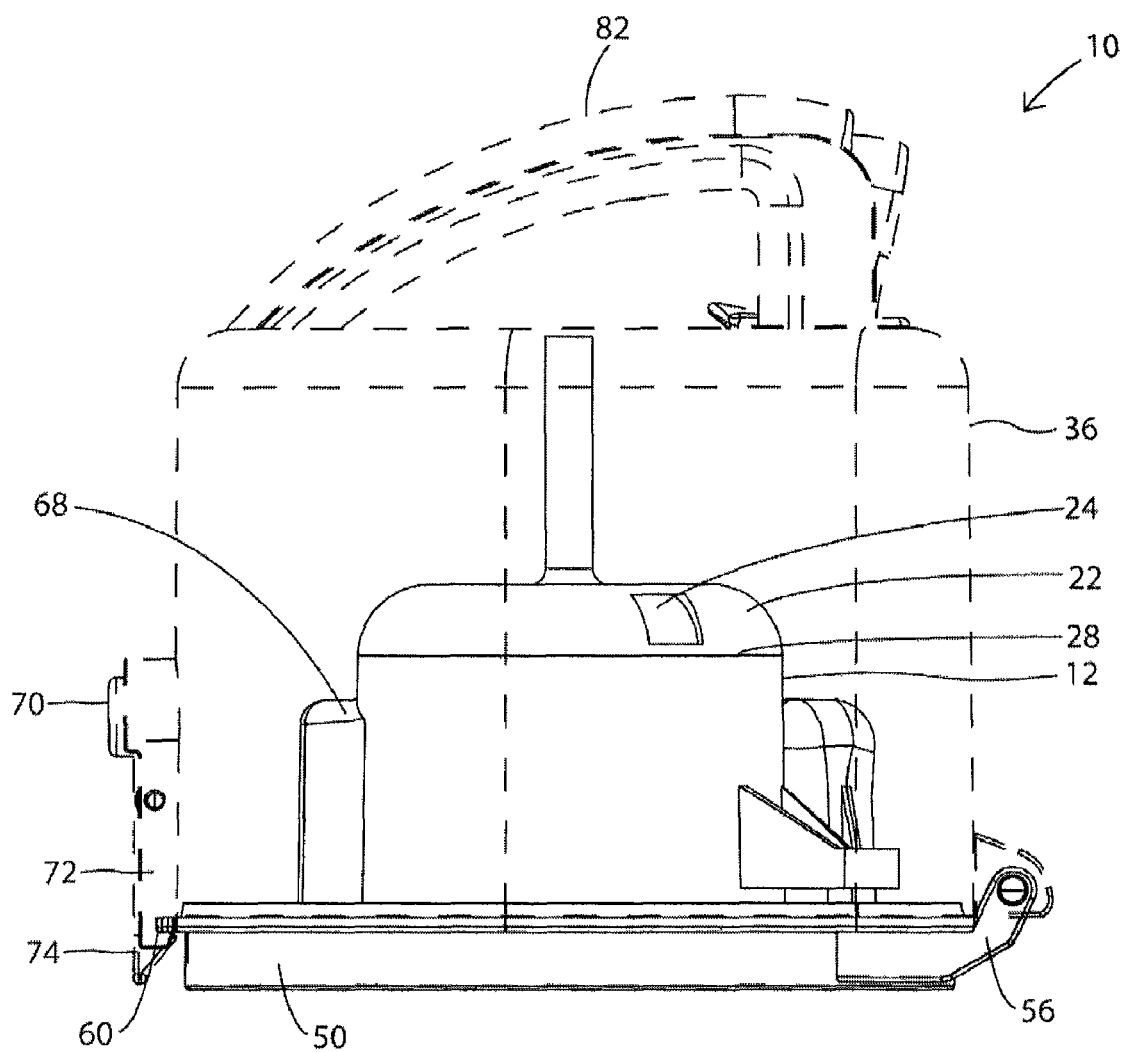
FIG. 9 is a side view of the cyclone separator of FIG. 8 shown encased in a housing.
Figure 10:
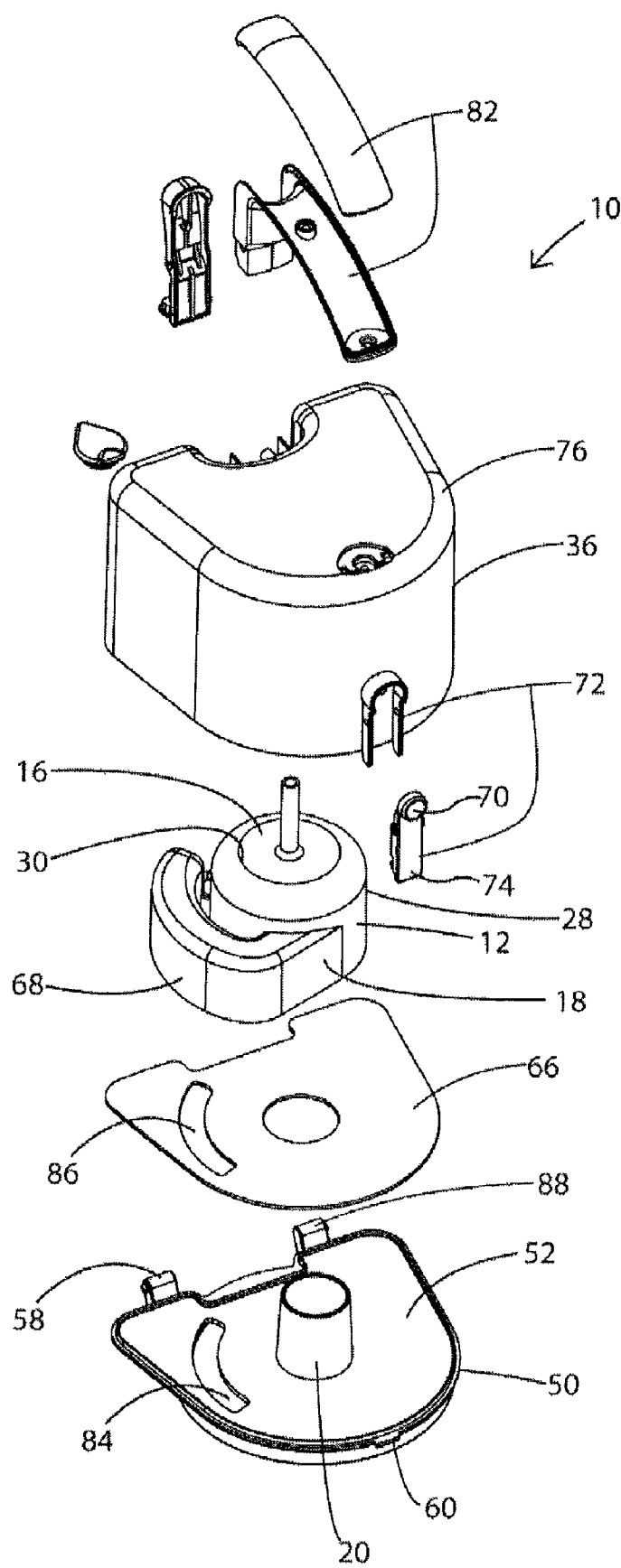
FIG. 10 is an exploded view of the second embodiment of FIG. 8.
Figure 25:
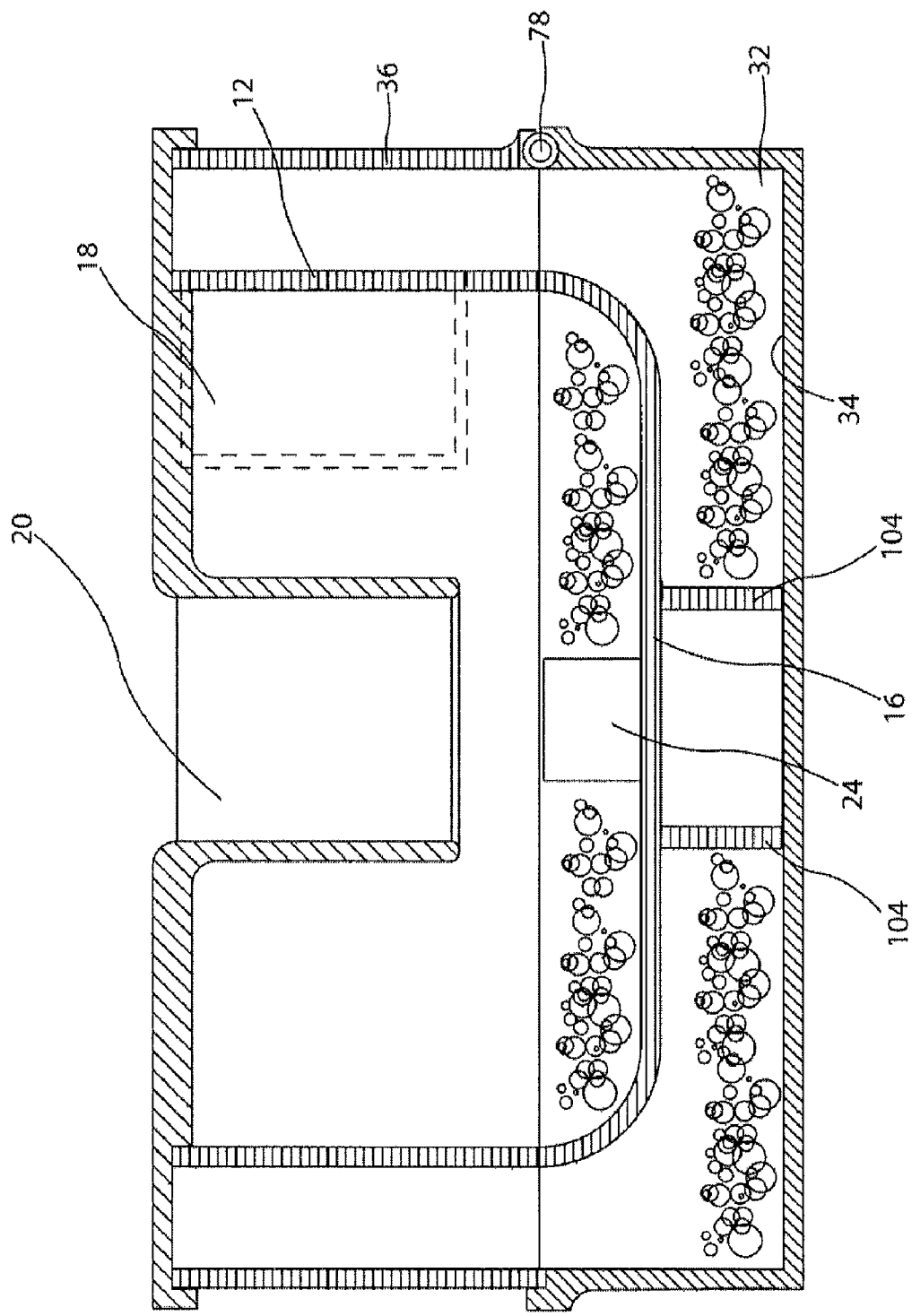
FIG. 25 is a front view of a vertical section of a cyclonic cleaning stage according to a ninth embodiment of this invention wherein the cyclone chamber is openable with the dirt collection chamber, showing the dirt collection chamber and the cyclone chamber in the closed position; and, FIG. 26 is a front view of a vertical section of a cyclonic cleaning stage according to a ninth embodiment of this invention wherein the cyclone chamber is openable with the dirt collection chamber, showing the dirt collection chamber and the cyclone chamber in the open position.
Figure 26:
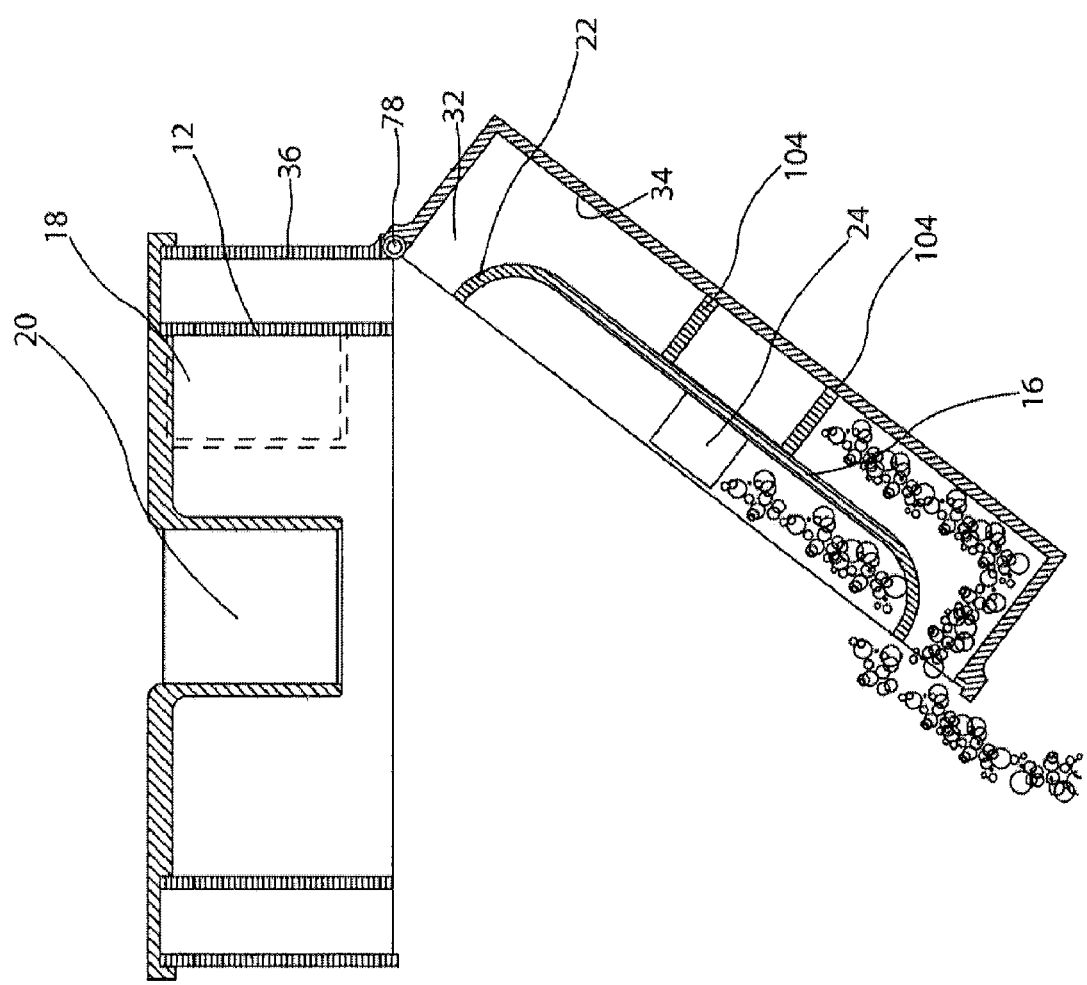

In order to permit dirt collection chamber 32 to be emptied, an opening is provided to access the interior of dirt collection chamber 32. Accordingly, collection surface 34 may be moveably or removable mounted or a door provided to permit access to dirt collection chamber 32. For example, collection surface 34 may be removable, as exemplified in FIG. 6. Alternately, or in addition, collection surface 34 may be pivotally mounted. For example, as exemplified in FIGS. 25 and 26, collection surface 34 is pivotally mounted to sidewall 36 by pivot pin 78. See also for example, the embodiments of FIGS. 9 and 13.

It will be appreciated that larger particulate matter may be collected in cyclone chamber 26. Accordingly, in any embodiment disclosed herein, access may be provided to the interior of cyclone chamber 26 as well. For example, as exemplified in the embodiment of FIGS. 13-18, cyclone chamber 26 may be opened independently of collection chamber 32. Alternately, cyclone chamber 26 may be opened when dirt collection chamber 32 is opened so that cyclone chamber 26 and collection chamber 32 may be emptied concurrently.

Accordingly, it will be appreciated that it is preferred that cyclone chamber 26 and collection chamber 32 are each openable. For example, lower end 16 and collection surface 34 may be each moveably mounted and may be joined together so that cyclone chamber 26 and collection chamber 32 are concurrently opened. As exemplified in FIGS. 25 and 26, bottom or second end wall 16 of cyclone chamber 26 may be secured or joined to collection surface 34, such as by ribs 104 and constructed to be openable with collection surface 34. The openable portion of each of cyclone chamber 26 and collection chamber 32 may be moveably mounted by any means known in the art. For example, they may be slideably or translatably mounted. Preferably, they are pivotally mounted. Alternately, they may be removably mounted, such as by means of a screw mount, a bayonet mount or securing members such as wing nuts.

As exemplified, cyclone chamber is openable at the juncture of transition member 22 and sidewall 12. Accordingly, when a latch or lock is released, collection surface 34 may be moved to the open position shown in FIG. 26 and accordingly, bottom 16 and transition member 22 are concurrently moved to the open position.

In an alternate embodiment, cyclone chamber 26 may be inverted. In such a case, as exemplified in FIGS. 8-12, collection surface 34 is spaced from opposed surface 33. Collection surface 34 and the first portion of the cyclone casing are openable and, preferably concurrently openable. For example, they may be moveably mounted and connected together. They may be moveably mounted by any means known in the art. For example, they may be slideably or translatably mounted. Preferably, they are pivotally mounted. Alternately, they may be removably mounted, such as by means of a screw mount, a bayonet mount or securing members such as wing nuts. For example, as exemplified in FIGS. 11 and 12, the bottom of the cyclone chamber (when the cyclone chamber is in an inverted orientation) and the collection chamber may both be emptied at the same time by the cyclone chamber and the dirt collection chamber having a bottom panel that are adjacent (e.g., lie in a common plane) and are preferably integrally formed.

It will be appreciated that bottom 16 may be constructed to be opened subsequently to collection chamber 32 (e.g., bottom 16 may not be secured to collection surface 34).

If side air passage 56 is provided, then collection surface 34 may incorporate a cut out 62, which meets, preferably in an airtight manner, with bottom 64 of side air passage 56.

An alternate embodiment is shown in FIGS. 8-12. In this alternate embodiment, the cyclone is inverted. Accordingly, air inlet 18 and air outlet 20 are provided in first end 14, which comprises the lower end of the cyclone separator apparatus 10. Accordingly, in operation, air will enter inlet 18 via, e.g., tangential passage 68. The air will then travel upwardly in a cyclonic fashion in cyclone chamber 26 prior to exiting through outlet 20, which is preferably provided in first end 16.

Heavier material (e.g. particulate material) will exit outlet 24 provided, preferably, in transition member 22 and accumulate in the separated material collection chamber 32. If a sealing gasket 66 is optionally provided as exemplified in FIG. 10, then the upper surface of gasket 66 functions as collection surface 34.

Figure 11:
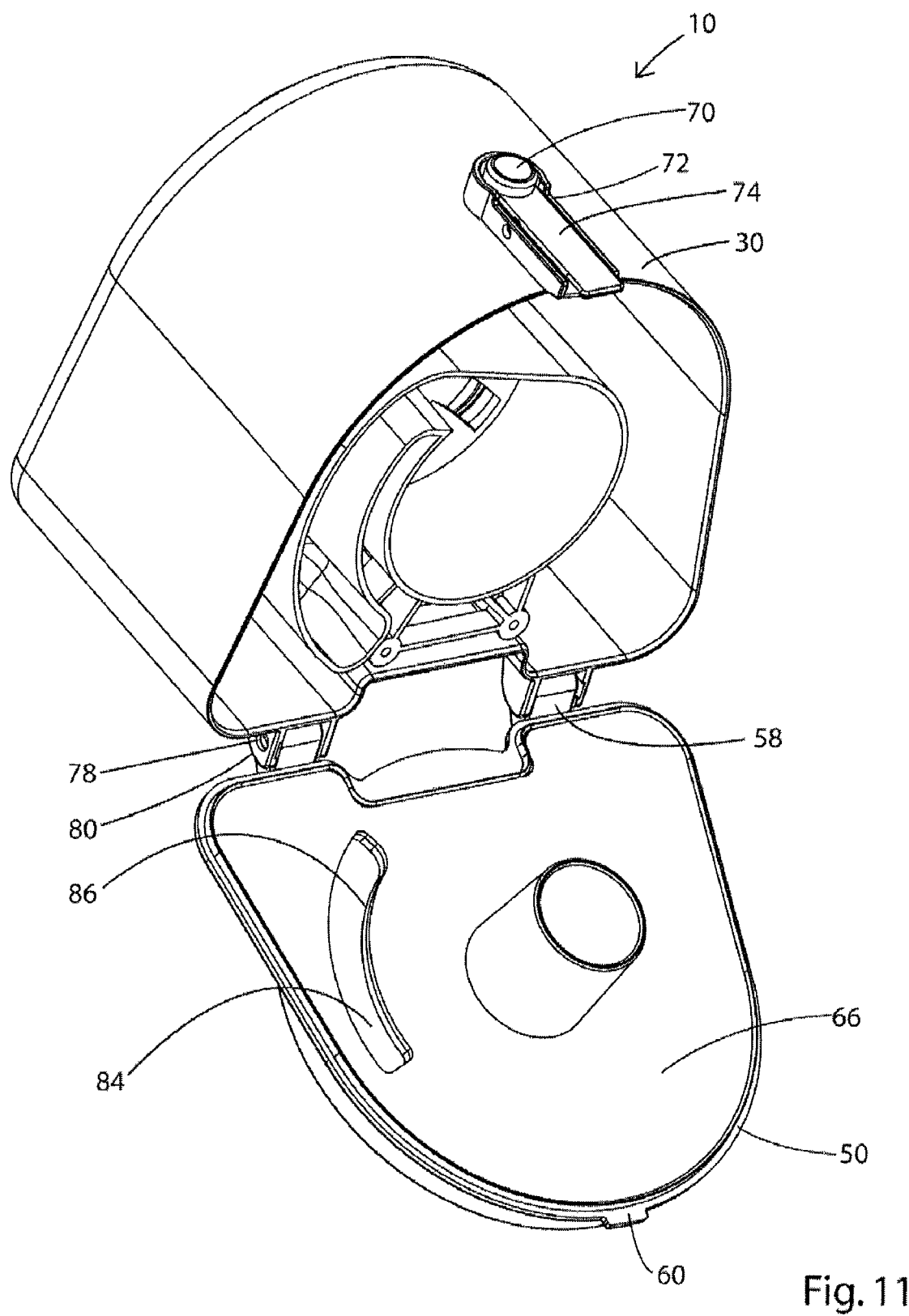
FIG. 11 is a perspective view from below of the cyclone separator of FIG. 8 showing an optional embodiment that permits the cyclone separator to be opened to permit emptying.

In order to empty cyclone separator assembly 10, a latch 72 may be provided. For example, button 70 of latch 72 may be pressed moving arm 74 outwardly thereby disengaging arm 74 from flange 60, thereby permitting bottom panel 50 to pivot downwardly (as shown in FIGS. 11 and 12) to permit the interior cyclone chamber 26 and collection area 22 to be emptied. Bottom panel 50 may be pivotally mounted to sidewall 36 of casing 76 such as by pivot pin 78 extending transversely to connect flange 58 of bottom panel 50 with flange 80 affixed to sidewall 36.

Accordingly, by opening bottom panel 50, preferably over a garbage can or the like, material collected inside cyclone chamber 26 and collection chamber 32 may be emptied. In this embodiment, the collection surface 34 and second end 16 are integrally formed (i.e. they are defined by bottom panel 50). Accordingly, both chambers may be emptied concurrently. In an alternate design they may be separately opened (e.g., if collection surface 34 and second end 16 are separate members).

In a particularly preferred embodiment, cyclone separator apparatus 10 comprises an upper portion of an upright vacuum cleaner. Accordingly, housing 76 may be provided with a handle 82 which may be connected to cyclone separator apparatus 10 by any means known in the art. Air inlet 18 may be in airflow communication with a dirty air inlet or the like of a vacuum cleaner, as a first or subsequent cleaning stage, via opening 84 in panel 50 and opening 86 in optional gasket 66.

A further alternate embodiment is exemplified in FIGS. 13-18. In this alternate embodiment, a plurality of the cyclone separators 10 is provided. Preferably, the plurality of cyclone separators 10 is provided in parallel. More preferably, the plurality of cyclone separators 10 is provided as a second cleaning stage 130, more preferably a second cyclonic cleaning stage and most preferably a second cyclonic cleaning stage of parallel cyclones in a surface cleaning apparatus 120. Any number of cyclone separator apparatus 10 may be provided.

Figure 13:
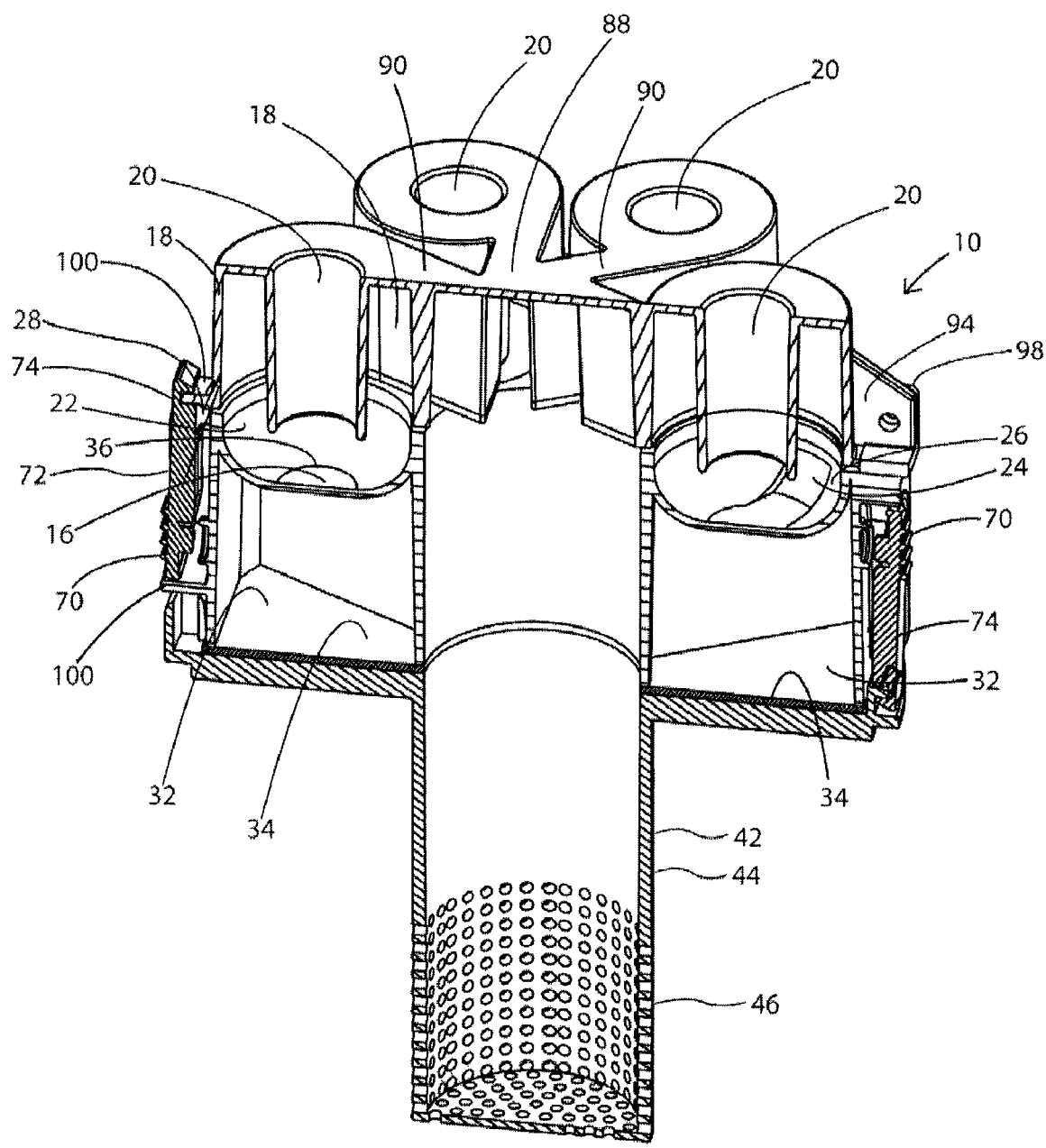
FIG. 13 is a perspective vertical section through a third embodiment of a cyclonic cleaning stage according to this invention wherein a plurality of cyclone separators are connected in parallel.
Figure 13A:
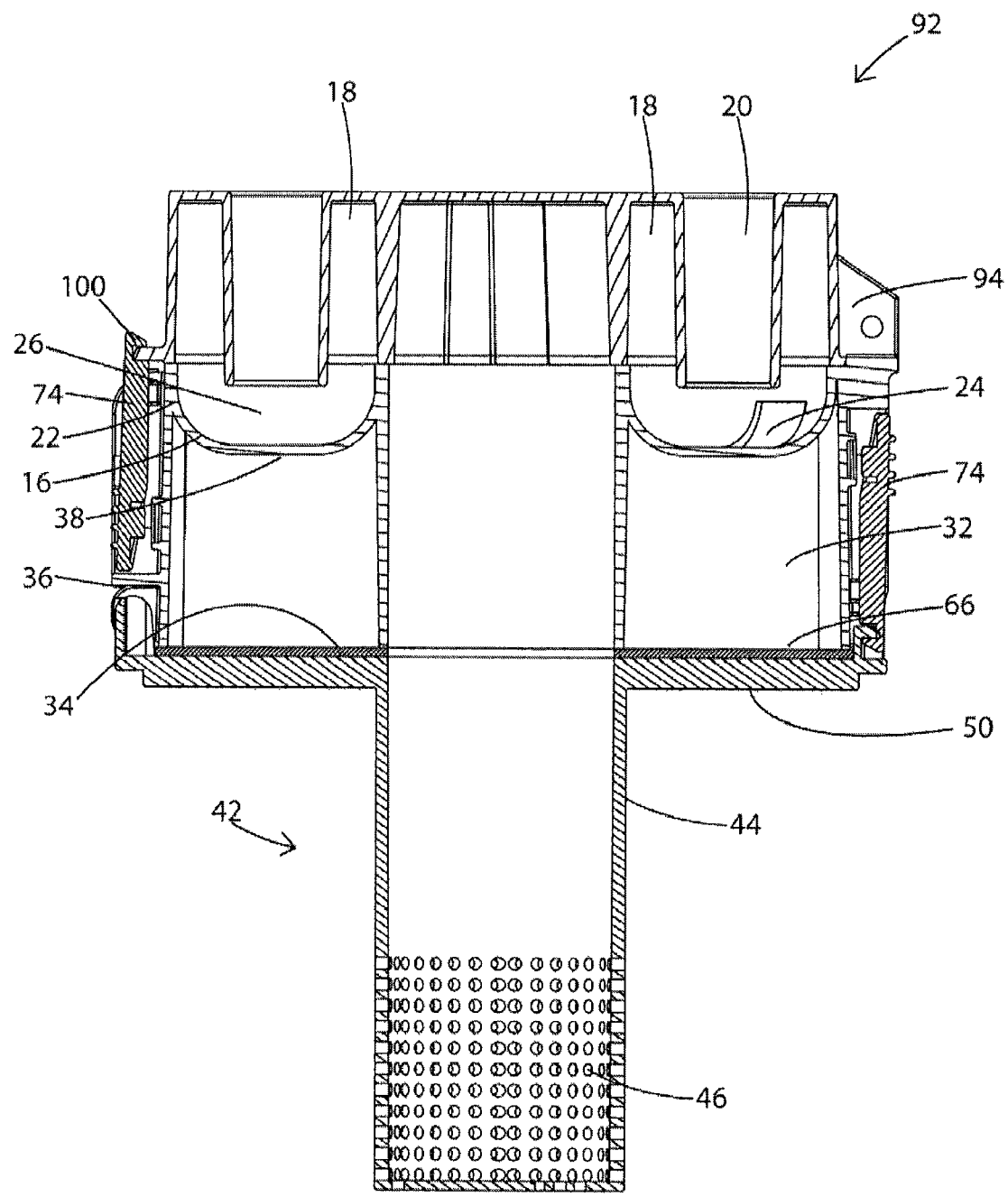
FIG. 13a is a vertical section through the third embodiment of FIG. 13.
Figure 14:
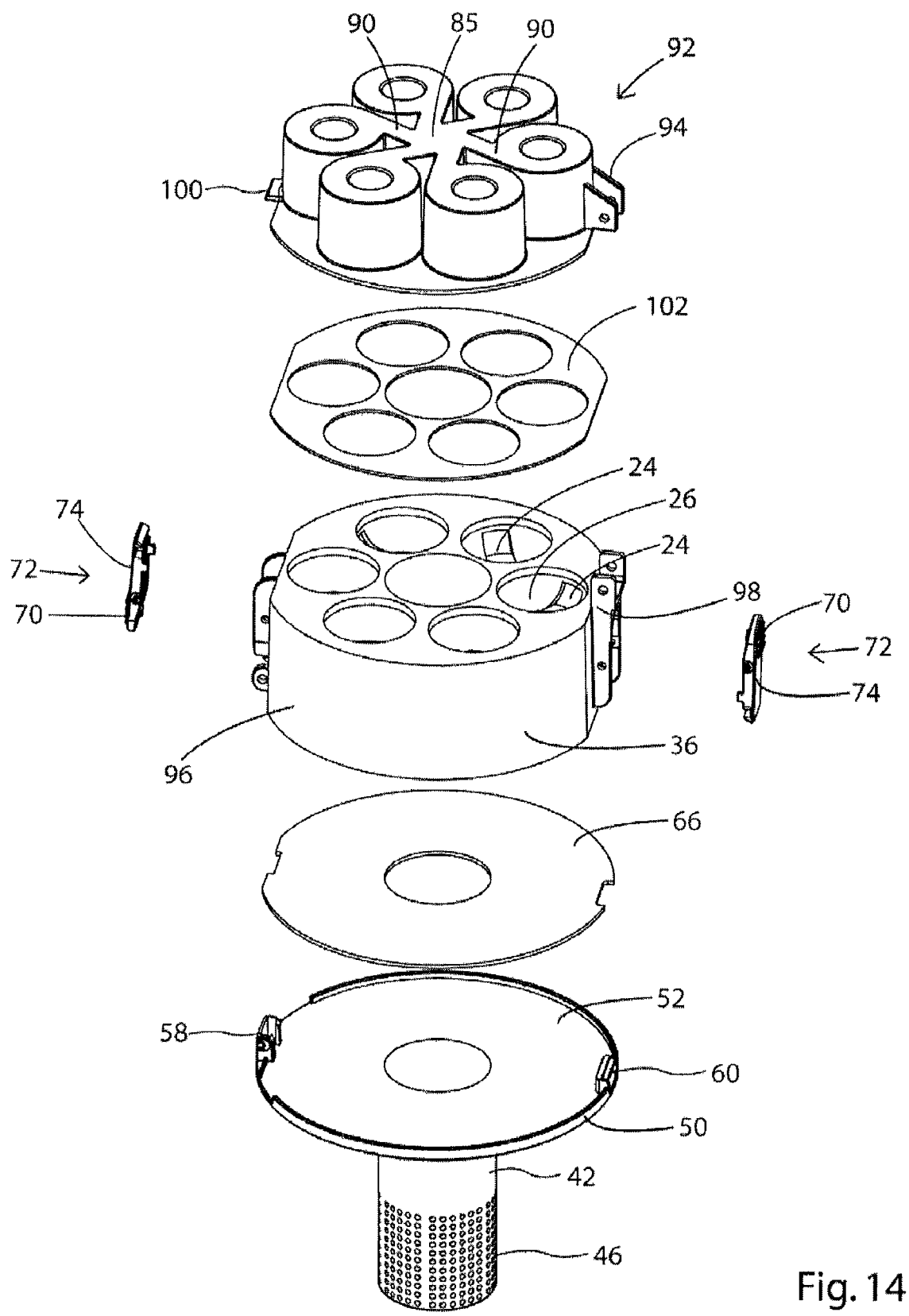
FIG. 14 is an exploded view of the cyclone separator of FIG. 13.
Figure 15:
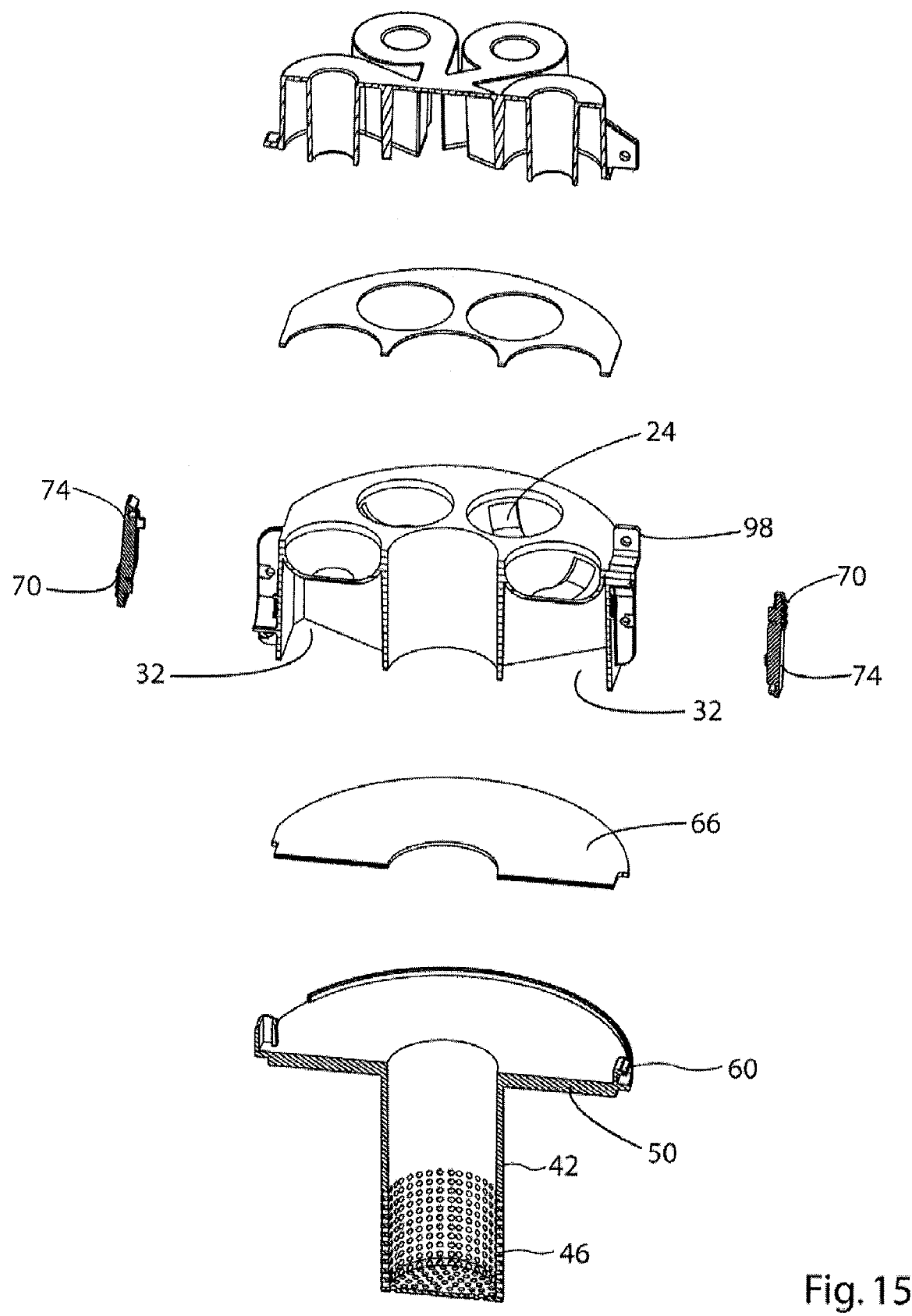
FIG. 15 is a vertical section through the exploded view of FIG. 14.
Figure 16:
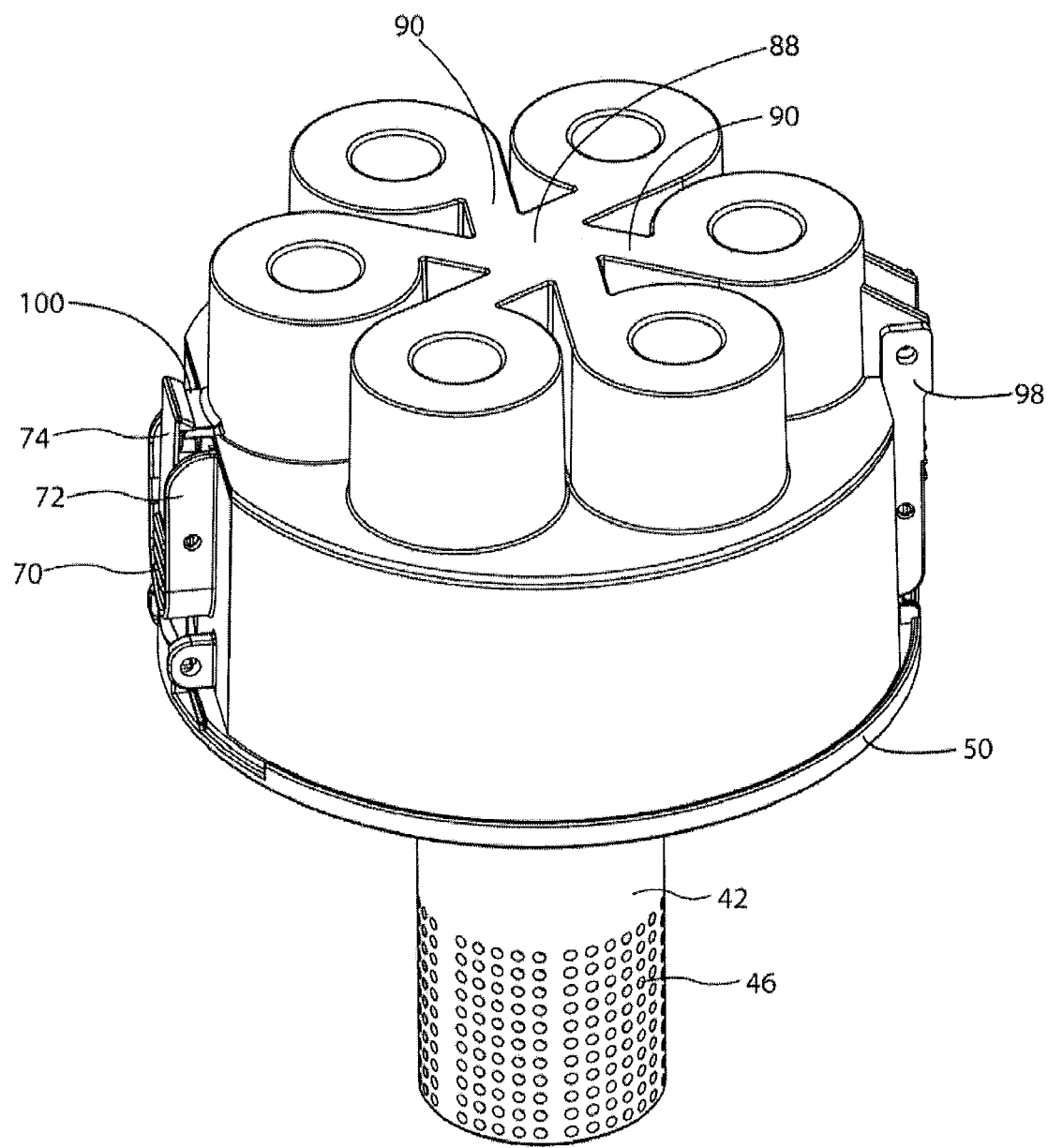
FIG. 16 is a perspective view of the assembled plurality of cyclone separators of FIG. 13.
Figure 17:
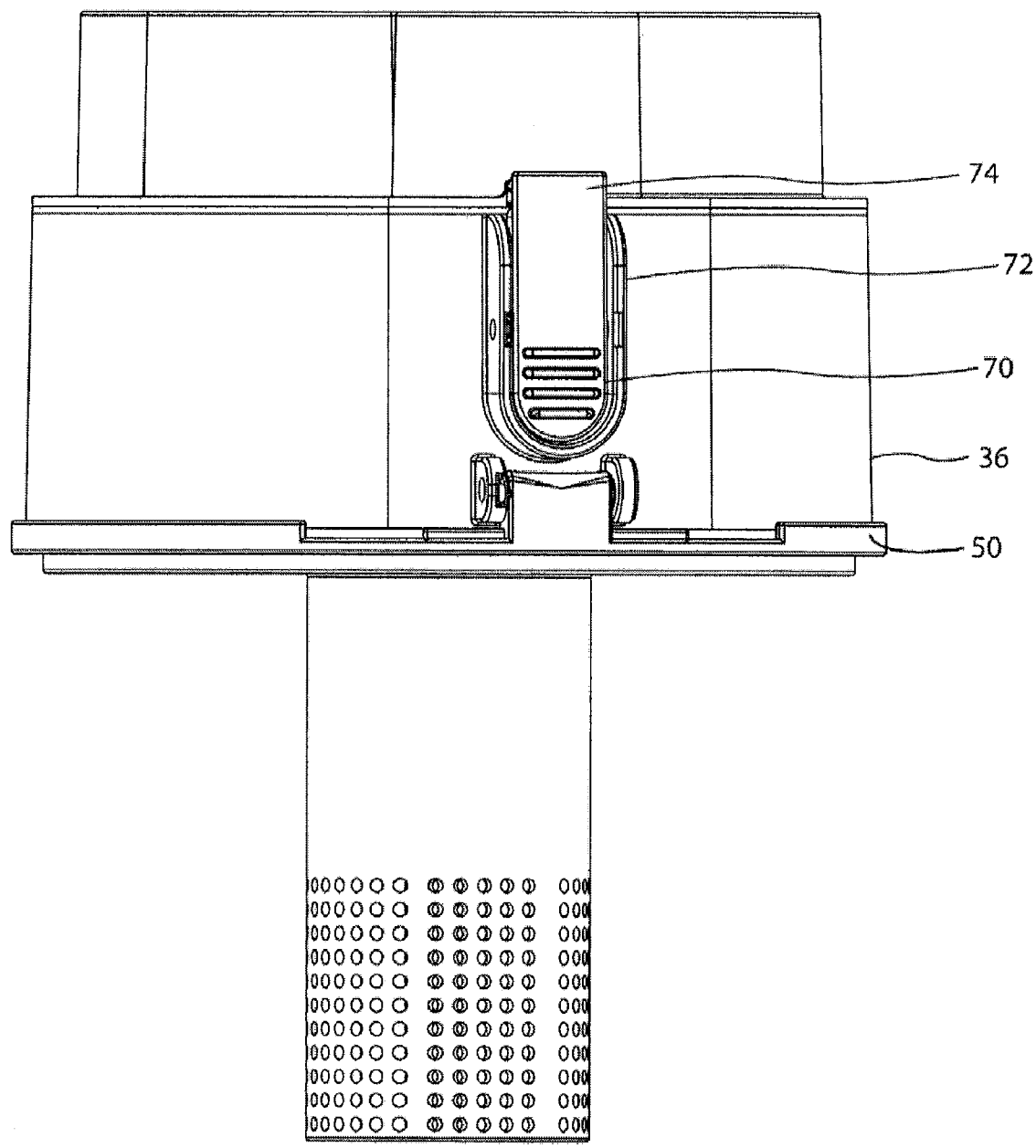
FIG. 17 is a side view of one side of the assembled plurality of cyclone separators of FIG. 13.
Figure 18:
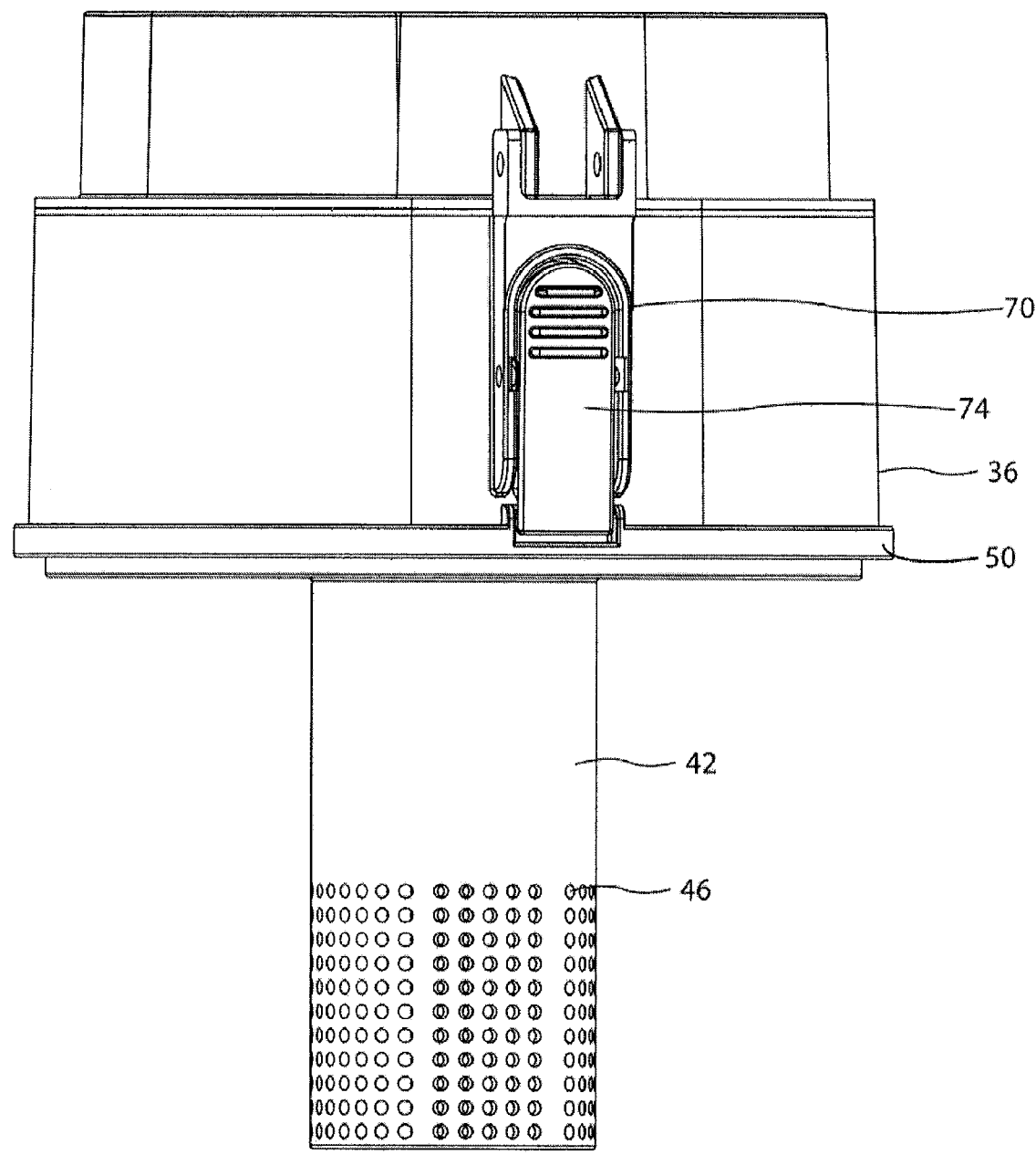
FIG. 18 is a side view of the other side of the assembled plurality of cyclone separators of FIG. 13.

Referring to FIG. 13, each cyclone separator assembly 10 may be the same as any embodiment disclosed herein. As exemplified in FIG. 13, cyclone separator assembly 10 is in an upright configuration. Alternately, as shown in FIGS. 8-12, each cyclone separator assembly 10 may be inverted.

Preferably at least one, and more preferably each cyclone separator assembly 10 may have a transition member 22 with a dirt outlet 24. A dirt collection chamber 32 is preferably provided exterior to cyclone chamber 26 and in flow communication with dirt outlet 24. As exemplified, dirt collection chamber 32 is preferably positioned below end wall 16. Alternately, dirt collection chamber 32 may be provided surrounding cyclone chamber 26 as exemplified in FIGS. 1-12 and 19-26. If the cyclone separator is at a different orientation, it will be appreciated that collection surface 34 may be located elsewhere. Preferably, as exemplified, each cyclone separator 10 has a dirt collection chamber 32 that is isolated from (i.e., not in flow communication with) the other dirt collection chambers 32.

As shown in the cross-section of FIG. 13, air may enter through apertures 46 into outlet 42 and travel upwardly to a central hub 88, which has an arm 90 extending to each cyclone separator assembly 10.

In order to permit dirt collection chambers 32 to be emptied, a door or the like may be provided to each dirt collection chamber 32. Preferably, as exemplified, the dirt collection chambers 32 have a common wall (e.g., floor) that is moveably mounted to permit the dirt collections chambers to be emptied simultaneously. The common wall may be slideably or translatably mounted. Preferably, it is pivotally mounted. Alternately, it may be removably mounted, such as by means of a screw mount, a bayonet mount or securing members such as wing nuts.

As exemplified, a latch 72 may be provided. Latch 72 may be provided with an arm 74, which engages flange 60 on panel 50. When panel 50 pivots open, then each dirt collection chamber 32 may be emptied.

In case of a blockage, each cyclone chamber 26 may be openable. For example, inlet portion 92, which comprises each of the air inlets to cyclone chamber 26, may be slideably or translatably mounted. Preferably, it is pivotally mounted. Alternately, it may be removably mounted, such as by means of a screw mount, a bayonet mount or securing members such as wing nuts. As exemplified, inlet portion 92, is pivotally mounted via flange 94 to the cyclone separator body that define cyclone chamber 26 which are provided in cyclone body portion section 96. Cyclone body portion section 96 may be provided with a flange 98 to which flange 94 is attached, e.g. pivotally attached. A latch 72 may be provided on cyclone body portion section 96, which engages a flange 100 on inlet portion 92. When button 70 is pressed, latch 72 opens permitting inlet portion to pivot open thereby providing access the interior of cyclone chambers 36.

A gasket 102 may be provided between inlet portion 92 and cyclone body portion section 96 so as to assist in creating an airtight seal when latch 72 engages flange 100. It will be appreciated that an O-ring, or other sealing member known in the art may be used.

In case cyclone chambers 26 require emptying, button 70 of latch 72 may be pressed. Inlet portion 92 may then be pivoted upwardly together with gasket 102, or alternately gasket 102 is subsequently removed or remains in position. Cyclone chambers 26 may then be inverted permitting them to be emptied.

In operation, air travels upwardly through optional outlet 42 into the interior of central hub 88 where the air is then distributed into each arm 90, which is preferably in airflow communication with only a single cyclone separator apparatus 10. The air enters each cyclone chamber 26 via air inlet 18 and exists via outlet 20. Outlets 20 may be combined into a single passage at any desired position. An embodiment is exemplified in FIG. 19. Each dirt outlet 24 is preferably in communication with a separate dirt collection chamber 32. Each collection chamber 32 may be simultaneously emptied by having a single movable or removable bottom member 50, which may be pivotally mounted to sidewall 36 as exemplified and discussed with respect to the embodiment of FIGS. 1-7. A gasket 66, O-ring or the like may be provided to provide an airtight seal between dirt collection chambers 32 and bottom 50.

Figure 19:
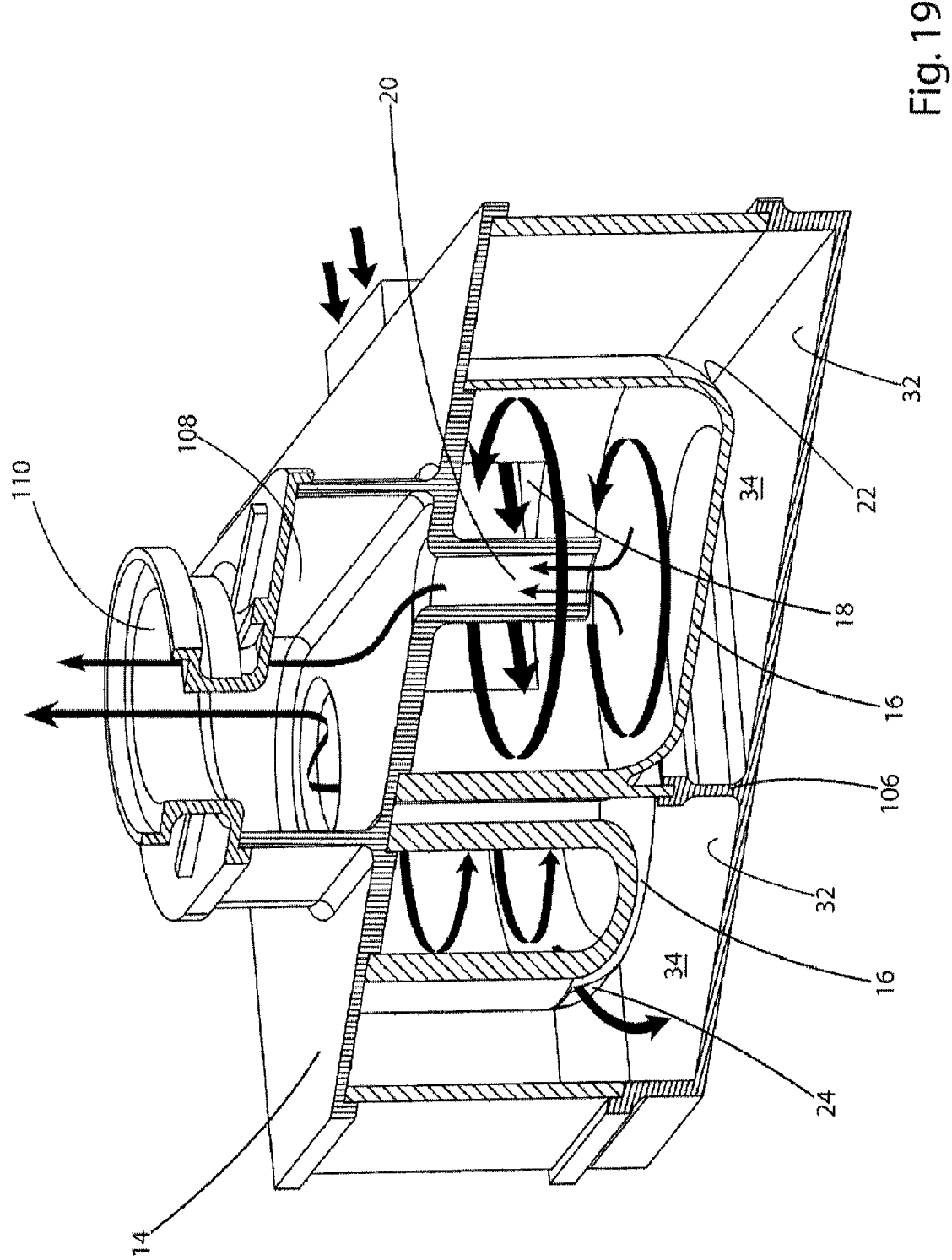
FIG. 19 is a vertical section through a fourth embodiment of a cyclonic cleaning stage according to this invention wherein a plurality of cyclone separators are connected in parallel.
Figure 20:
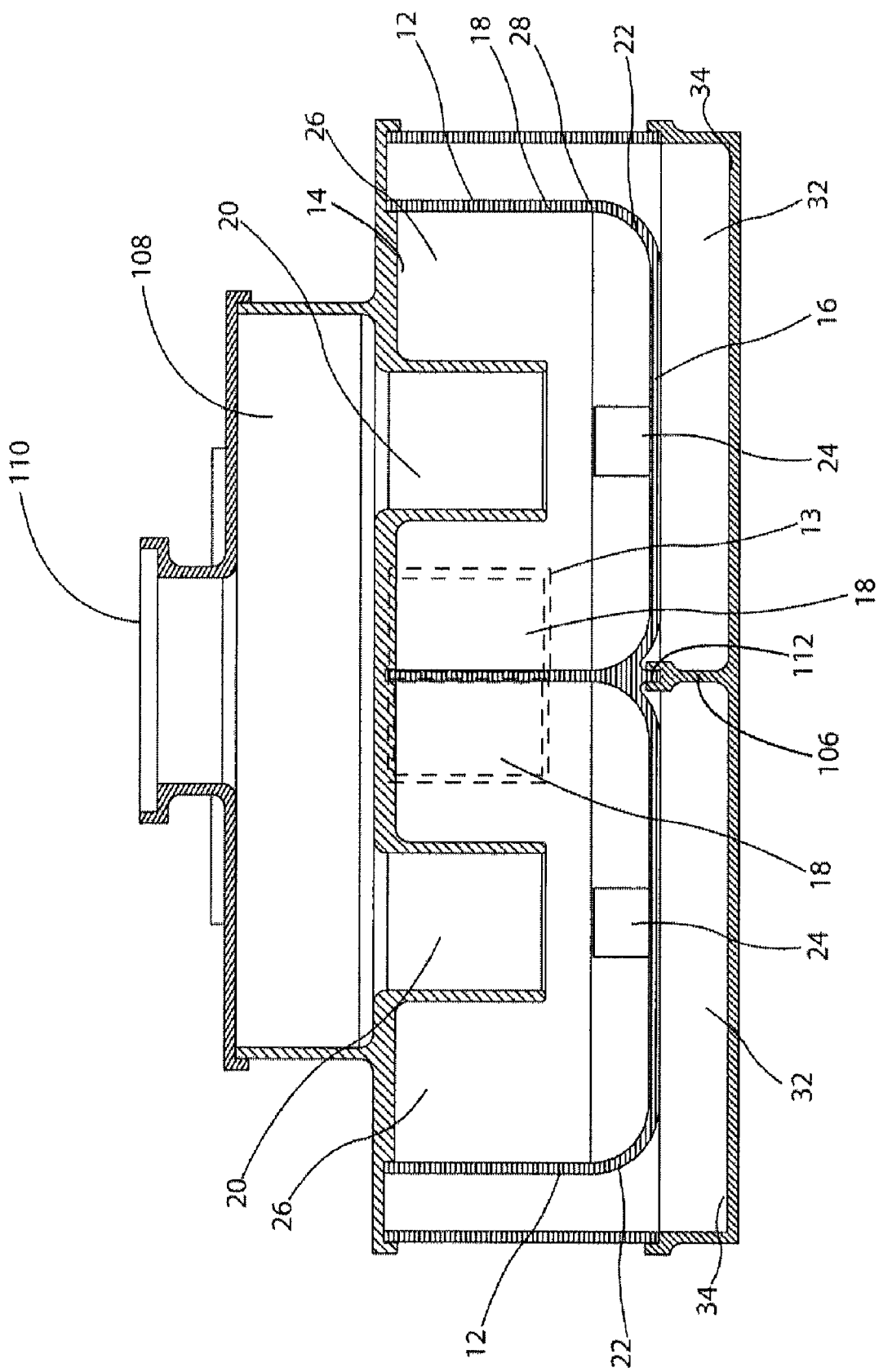
FIG. 20 is a front view of the vertical section of the cyclonic cleaning stage of FIG. 19.
Figure 21:
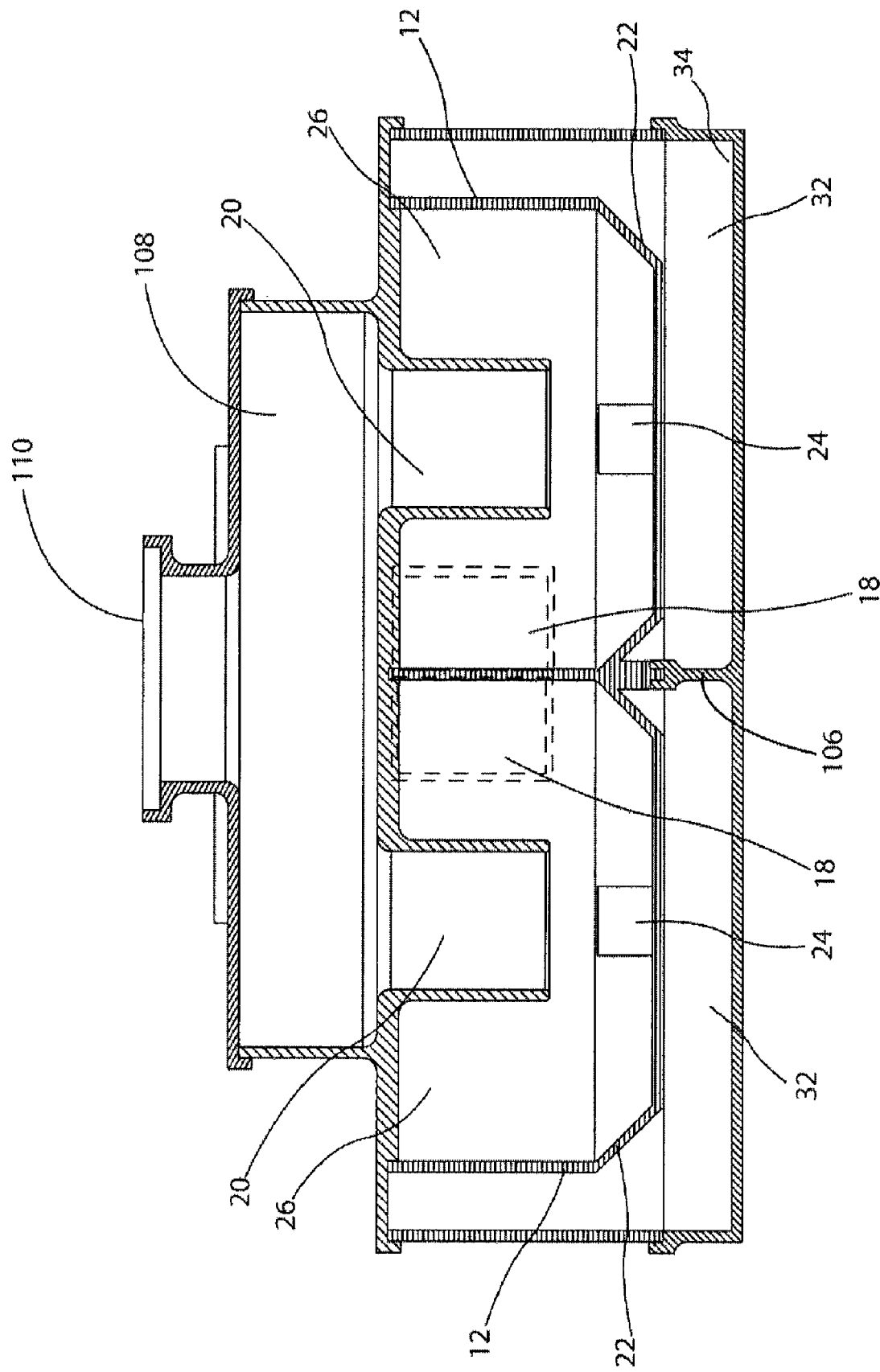
FIG. 21 is a front view of a vertical section of a cyclonic cleaning stage according to a fifth embodiment of this invention wherein the transition member is angled.
Figure 22:
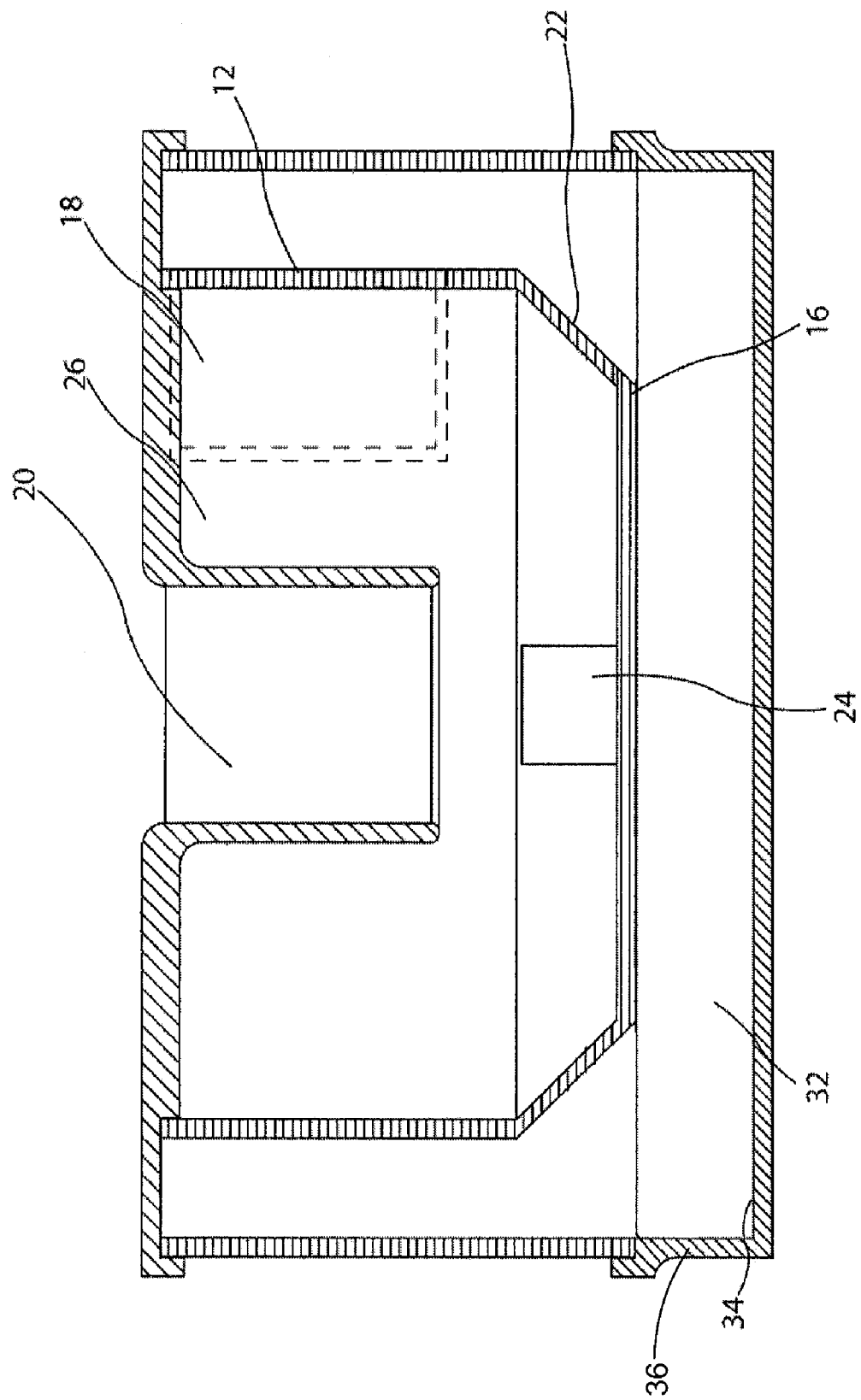
FIG. 22 is a front view of a vertical section of a cyclonic cleaning stage according to a sixth embodiment of this invention wherein the transition member is angled and the cyclonic cleaning stage comprises a single cyclone.

Further alternate embodiments are exemplified in FIGS. 19-21. In these alternate embodiments, a plurality of the cyclone separators 10 is provided. Preferably, the plurality of cyclone separators 10 is provided in parallel. More preferably, the plurality of cyclone separators 10 is provided as a second cleaning stage, more preferably a second cyclonic cleaning stage and most preferably a second cyclonic cleaning stage of parallel cyclones in a surface cleaning apparatus. Any number of cyclone separator apparatus 10 may be provided.

As in the alternate embodiment of FIGS. 13-18, each cyclone chamber has its own dirt collection chamber 32 that is isolated from the collection chambers 32 of the other cyclone separators 10. For example, as shown, dividing walls 106 separate collection chambers 32. It will be appreciated that, in alternate embodiments, collection chambers 32 need not have common walls. Dividing walls 106 may be secured to extension 112 of sidewall 12 of 16 of cyclone chamber 26 (see for example, FIG. 20) so as to function as a rib 104, such that second end 16 and collection 34 open concurrently. Alternately, dividing walls 106 may be removable from engagement with extension 112 such that collection chamber 32 may be emptied independent of cyclone chamber 26. Cyclone chamber 26 may be separately openable or may not be openable.

As exemplified, outlets 20 of cyclone separators 10 are in airflow communication with a header 108 having, preferably, a single outlet 110. Accordingly, a single flow passage may be provided downstream from the cyclonic cleaning stage exemplified in FIGS. 19-21.

As exemplified, optionally inlets 18 of cyclone separators 10 may be positioned adjacent each other (e.g., side by side). See also FIG. 13. In such a case, collection chamber 32 may surround only the second section, and not the inlet section, of sidewall 12.

It will be appreciated that any of the alternate or optional configurations or features may be used single or in any particular combination or sub-combination with other configurations or features disclosed herein.

It will be appreciated by those skilled in the art that various modifications and additions may be made in each or within the scope of the following claims. In particular, it will be appreciated that one or more cyclones as disclosed herein may be provided in an appliance, preferably in a surface cleaning appliance and, more preferably in a vacuum cleaner. The cyclones may be provided at any orientation and are preferably either inverted or in an upright orientation.

The invention claimed is:

1. A cyclone separator comprising:
   (a) a cyclone casing defining a cyclone chamber and having first and second spaced apart portions, a fluid inlet, a fluid outlet, a sidewall and a separated material outlet, the first portion including a first end and the second portion including closed opposed second end;
   (b) the fluid inlet is provided in the first portion;
   (c) the separated material outlet is provided in the second portion; and,
   (d) the second portion includes a transition member provided adjacent the second end, the transition member having an inner surface that extends inwardly to meet the second end.

2. The cyclone separator of claim 1 wherein the sidewall extends between the first end and the transition member in a first direction, the second end extends in a second direction, and the transition member extends in at least one third direction from the sidewall to the second end.

3. The cyclone separator of claim 1 wherein the sidewall has a longitudinal axis and the second end extends in a plane and the transition member extends at an angle to each of the longitudinal axis and the plane.

4. The cyclone separator of claim 1 wherein the transition member is curved.

5. The cyclone separator of claim 4 wherein the transition member extends along an arc of a circle.

6. The cyclone separator of claim 5 wherein the circle has a radius of from 0.125 to 2 inches.

7. The cyclone separator of claim 5 wherein the circle has a radius from 0.25 to 1 inch.

8. The cyclone separator of claim 5 wherein the circle has a radius from 0.375 to 0.75 inches.

9. The cyclone separator of claim 5 wherein the circle has a radius of about 0.5 inches.

10. The cyclone separator of claim 1 wherein the sidewall and the transition member define a height of the cyclone casing and the cyclone casing has a diameter, and the height is less then the diameter.

11. The cyclone separator of claim 10 wherein the height is less then half of the diameter.

12. The cyclone separator of claim 1 wherein the fluid inlet is provided in the sidewall and the fluid inlet has an end closer to the second end then the first end.

13. The cyclone separator of claim 12 wherein a portion of the sidewall extends between the end of the fluid inlet closer to the second end and the transition member.

14. The cyclone separator of claim 13 wherein the portion of the sidewall is straight.

15. The cyclone separator of claim 13 wherein the sidewall is straight.

16. The cyclone separator of claim 1 wherein the separated material outlet is provided in the transition member.

17. The cyclone separator of claim 16 wherein the separated material outlet is in fluid communication with a separated material collection chamber and the separated material collection chamber surrounds at least a portion of the cyclone casing.

18. The cyclone separator of claim 17 wherein the cyclone casing defines a cyclone chamber and the separated material collection chamber and the cyclone chamber are configured to be emptied concurrently.

19. The cyclone separator of claim 18 wherein the separated material collection chamber has an opposed surface facing the second end of the cyclone casing and the second end and the opposed surface are each moveably mounted.

20. The cyclone separator of claim 19 wherein second end and the opposed surface are connected together.

21. The cyclone separator of claim 18 wherein the separated material collection chamber has a distal end spaced from the opposed surface and the distal end and the first portion of the cyclone casing are openable.

22. The cyclone separator of claim 21 wherein the distal end and the first portion of the cyclone casing are concurrently openable.

23. The cyclone separator of claim 22 wherein the distal end and the first end of the cyclone casing are moveably mounted and connected together.

24. The cyclone separator of claim 1 further comprising a separated material collection chamber in communication with the separated material outlet and the cyclone chamber is openable with the separated material collection chamber.

25. The cyclone separator of claim 24 wherein the second end of the cyclone chamber is openable with a panel of the separated material collection chamber.

26. The cyclone separator of claim 25 wherein the second end of the cyclone chamber and the panel of the separated material collection chamber are in a common plane.

27. The cyclone separator of claim 25 wherein the second end of the cyclone chamber and the panel of the separated material collection chamber are integrally formed.

28. A surface cleaning apparatus comprising the cyclone separator of claim 1.

29. The surface cleaning apparatus of claim 28 wherein the second end is positioned below the first end.

30. The surface cleaning apparatus of claim 28 wherein, the cyclone separator comprises a second cyclonic cleaning stage of the surface cleaning apparatus.

31. The surface cleaning apparatus of claim 30 wherein, a plurality of the cyclone separators are connected in parallel to provide the second cyclonic cleaning stage.

32. A cyclone separator comprising:
   (a) a cyclone casing defining a cyclone chamber and having first and second spaced apart portions, a fluid inlet, a fluid outlet, a sidewall and a separated material outlet, the first portion including a first end and the second portion including an opposed second end;
   (b) the fluid inlet is provided in the first portion;
   (c) the separated material outlet is provided in the second portion;
   (d) the second portion includes a transition member provided adjacent the second end, the transition member having an inner surface that extends inwardly to meet the second end and the separated material outlet is provided in the transition member; and,
   (e) a separated material collection chamber surrounding at least a portion of the cyclone casing and the separated material outlet is in fluid communication with the separated material collection chamber,
wherein the separated material collection chamber and the cyclone chamber are configured to be emptied concurrently.

33. The cyclone separator of claim 32 wherein the separated material collection chamber has an opposed surface facing the second end of the cyclone casing and the second end and the opposed surface are each moveably mounted.

34. The cyclone separator of claim 33 wherein second end and the opposed surface are connected together.

35. The cyclone separator of claim 32 wherein the separated material collection chamber has a distal end spaced from the opposed surface and the distal end and the first portion of the cyclone casing are openable.

36. The cyclone separator of claim 35 wherein the distal end and the first portion of the cyclone casing are concurrently openable.

37. The cyclone separator of claim 36 wherein the distal end and the first end of the cyclone casing are moveably mounted and connected together.

38. A cyclone separator comprising:
   (a) a cyclone casing defining a cyclone chamber and having first and second spaced apart portions, a fluid inlet, a fluid outlet, a sidewall and a separated material outlet, the first portion including a first end and the second portion including an opposed second end;
   (b) the fluid inlet is provided in the first portion;
   (c) the separated material outlet is provided in the second portion;
   (d) the second portion includes a transition member provided adjacent the second end, the transition member having an inner surface that extends inwardly to meet the second end; and,
   (e) a separated material collection chamber in communication with the separated material outlet and the cyclone chamber is openable with the separated material collection chamber.

39. The cyclone separator of claim 38 wherein the second end of the cyclone chamber is openable with a panel of the separated material collection chamber.

40. The cyclone separator of claim 38 wherein the second end of the cyclone chamber and the panel of the separated material collection chamber are in a common plane.

41. The cyclone separator of claim 40 wherein the second end of the cyclone chamber and the panel of the separated material collection chamber are integrally formed.

42. A surface cleaning apparatus comprising a cyclone separator comprising:
   (a) a cyclone casing defining a cyclone chamber and having first and second spaced apart portions, a fluid inlet, a fluid outlet, a sidewall and a separated material outlet, the first portion including a first end and the second portion including an opposed second end that is positioned below the first end;
   (b) the fluid inlet is provided in the first portion;
   (c) the separated material outlet is provided in the second portion; and,
   (d) the second portion includes a transition member provided adjacent the second end, the transition member having an inner surface that extends inwardly to meet the second end,
wherein, the cyclone separator comprises a second cyclonic cleaning stage of the surface cleaning apparatus.

43. The surface cleaning apparatus of claim 42 wherein, a plurality of the cyclone separators are connected in parallel to provide the second cyclonic cleaning stage.

* * * * *